US010645704B2

(12) United States Patent
Raghavan et al.

(10) Patent No.: US 10,645,704 B2
(45) Date of Patent: May 5, 2020

(54) MULTI-USER MULTIPLE-INPUT/MULTIPLE-OUTPUT TRANSMISSIONS IN MILLIMETER WAVE SYSTEMS

(71) Applicant: QUALCOMM Incorporated, San Diego, CA (US)

(72) Inventors: Vasanthan Raghavan, West Windsor Township, NJ (US); Miguel Rodrigo Castellanos Llorca, West Lafayette, IN (US); Jung Ryu, Fort Lee, NJ (US); Sundar Subramanian, San Diego, CA (US); Juergen Cezanne, Ocean Township, NJ (US); Junyi Li, Chester, NJ (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/997,157

(22) Filed: Jun. 4, 2018

(65) Prior Publication Data
US 2018/0368149 A1    Dec. 20, 2018

Related U.S. Application Data

(60) Provisional application No. 62/520,495, filed on Jun. 15, 2017.

(51) Int. Cl.
*H04W 72/08* (2009.01)
*H04B 7/0452* (2017.01)
(Continued)

(52) U.S. Cl.
CPC ........ *H04W 72/082* (2013.01); *H04B 7/0452* (2013.01); *H04B 7/0473* (2013.01);
(Continued)

(58) Field of Classification Search
None
See application file for complete search history.

(56) References Cited

U.S. PATENT DOCUMENTS

2008/0134254 A1* 6/2008 Xia ..................... H04B 7/0617
725/62
2008/0205537 A1* 8/2008 Kim ..................... H04B 7/0408
375/267

(Continued)

OTHER PUBLICATIONS

International Search Report and Written Opinion—PCT/US2018/036036—ISA/EPO—dated Aug. 27, 2018 (174821WO).

Primary Examiner — Anh Vu H Ly
(74) Attorney, Agent, or Firm — Holland & Hart LLP

(57) ABSTRACT

Methods, systems, and devices for wireless communication are described. A user equipment (UE) may identify a set of transmit beams having a channel characteristic above a first threshold. The set of transmit beams may be an ordered list of transmit beams based on the associated channel characteristic of each transmit beam. The UE may determine, based at least in part on the set of transmit beams, a cross-correlation metric between a set of receive beams. The set of receive beams may include an ordered list of receive beam configurations with channel characteristic above a second threshold. The UE may transmit a message that identifies the cross-correlation metric between beams in the set of receive beams.

30 Claims, 14 Drawing Sheets

(51) Int. Cl.
*H04W 72/14* (2009.01)
*H04W 72/12* (2009.01)
*H04B 7/0456* (2017.01)
*H04B 7/08* (2006.01)
*H04B 7/06* (2006.01)
*H04W 72/04* (2009.01)
*H04B 7/0408* (2017.01)
*H04W 72/06* (2009.01)

(52) U.S. Cl.
CPC ......... *H04B 7/0632* (2013.01); *H04B 7/0695* (2013.01); *H04B 7/088* (2013.01); *H04W 72/046* (2013.01); *H04W 72/085* (2013.01); *H04W 72/1231* (2013.01); *H04W 72/14* (2013.01); *H04B 7/0408* (2013.01); *H04W 72/06* (2013.01)

(56) References Cited

U.S. PATENT DOCUMENTS

| | | | |
|---|---|---|---|
| 2009/0121935 A1 | 5/2009 | Xia et al. | |
| 2012/0057575 A1* | 3/2012 | Taghavi Nasrabadi | H04B 7/0617 370/338 |
| 2012/0243638 A1 | 9/2012 | Maltsev et al. | |
| 2013/0172002 A1 | 7/2013 | Yu et al. | |
| 2013/0315321 A1* | 11/2013 | Rajagopal | H04L 27/2607 375/260 |
| 2014/0334566 A1* | 11/2014 | Kim | H04B 7/0469 375/267 |
| 2015/0282122 A1 | 10/2015 | Kim et al. | |
| 2015/0289147 A1* | 10/2015 | Lou | H04B 7/0408 370/329 |
| 2018/0048375 A1* | 2/2018 | Guo | H04B 7/088 370/328 |
| 2018/0048442 A1* | 2/2018 | Sang | H04B 7/0617 370/328 |
| 2018/0262366 A1* | 9/2018 | Sahin | H04B 7/0452 370/328 |
| 2018/0338321 A1* | 11/2018 | Shepard | H04B 7/0452 370/328 |
| 2019/0123864 A1* | 4/2019 | Zhang | H04B 7/088 370/328 |

\* cited by examiner

MULTI-USER MULTIPLE-INPUT/MULTIPLE-OUTPUT TRANSMISSIONS IN MILLIMETER WAVE SYSTEMS

CROSS REFERENCES

The present application for patent claims priority to U.S. Provisional Patent Application No. 62/520,495 by Raghavan et al., entitled "MULTI-USER MULTIPLE-INPUT/MULTIPLE-OUTPUT TRANSMISSIONS IN MILLIMETER WAVE SYSTEMS," filed Jun. 15, 2017, assigned to the assignee hereof and incorporated herein by reference.

INTRODUCTION

The following relates generally to wireless communication, and more specifically to multi-user multiple-input/multiple-output (MU-MIMO) transmissions in millimeter wave (mmW) systems.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communication system may include a number of base stations or access network nodes, each simultaneously supporting communication for multiple communication devices, which may be otherwise known as user equipment (UE).

Certain wireless communications may operate in a mmW spectrum using beamformed transmissions. The base station and/or UE may have a number of antenna subarrays, with each subarray including multiple antennas. For example, a base station may have an 8×8, 8×16, or some other large number of planar antenna subarrays, and the UE may have 2, 4, 8, etc., antenna subarrays. The base station and/or UE may use analog/digital steering to direct transmission beams in a particular direction, in a particular shape, etc. At the receiving end, the antenna subarrays may also be configured to optimally receive the transmissions, e.g., may have optimal or best receive beams. In some aspects, having multiple antenna subarrays may support MU-MIMO transmissions where the base station transmits signals to multiple UEs within its coverage area.

SUMMARY

A method of wireless communication is described. The method may include identifying a set of transmit beams having a channel characteristic above a first threshold, the set of transmit beams comprising an ordered list of transmit beams based on the associated channel characteristic of each transmit beam, determining, based at least in part on the set of transmit beams, a cross-correlation metric between a set of receive beams, the set of receive beams comprising an ordered list of receive beam configurations with channel characteristic above a second threshold, and transmitting a message that identifies the cross-correlation metric between beams in the set of receive beams.

An apparatus for wireless communication is described. The apparatus may include means for identifying a set of transmit beams having a channel characteristic above a first threshold, the set of transmit beams comprising an ordered list of transmit beams based on the associated channel characteristic of each transmit beam, means for determining, based at least in part on the set of transmit beams, a cross-correlation metric between a set of receive beams, the set of receive beams comprising an ordered list of receive beam configurations with channel characteristic above a second threshold, and means for transmitting a message that identifies the cross-correlation metric between beams in the set of receive beams.

Another apparatus for wireless communication is described. The apparatus may include a processor, memory in electronic communication with the processor, and instructions stored in the memory. The instructions may be operable to cause the processor to identify a set of transmit beams having a channel characteristic above a first threshold, the set of transmit beams comprising an ordered list of transmit beams based on the associated channel characteristic of each transmit beam, determine, based at least in part on the set of transmit beams, a cross-correlation metric between a set of receive beams, the set of receive beams comprising an ordered list of receive beam configurations with channel characteristic above a second threshold, and transmit a message that identifies the cross-correlation metric between beams in the set of receive beams.

A non-transitory computer readable medium for wireless communication is described. The non-transitory computer-readable medium may include instructions operable to cause a processor to identify a set of transmit beams having a channel characteristic above a first threshold, the set of transmit beams comprising an ordered list of transmit beams based on the associated channel characteristic of each transmit beam, determine, based at least in part on the set of transmit beams, a cross-correlation metric between a set of receive beams, the set of receive beams comprising an ordered list of receive beam configurations with channel characteristic above a second threshold, and transmit a message that identifies the cross-correlation metric between beams in the set of receive beams.

Some examples of the method, apparatus, and non-transitory computer-readable medium described above may further include processes, features, means, or instructions for performing a beam training phase between the UE and a base station to identify the set of transmit beams and the set of receive beams.

Some examples of the method, apparatus, and non-transitory computer-readable medium described above may further include processes, features, means, or instructions for performing the beam training phase using a first channel. Some examples of the method, apparatus, and non-transitory computer-readable medium described above may further include processes, features, means, or instructions for transmitting the message using a second channel, wherein the second channel may be associated with a lower data rate with respect to the first channel.

In some examples of the method, apparatus, and non-transitory computer-readable medium described above, the first channel comprises a millimeter wave channel and the second channel comprises a sub-6 GHz channel.

In some examples of the method, apparatus, and non-transitory computer-readable medium described above, the first channel comprises a millimeter wave data channel and the second channel comprises a millimeter wave control channel.

Some examples of the method, apparatus, and non-transitory computer-readable medium described above may further include processes, features, means, or instructions for transmitting a codebook entry to indicate the identifier of each beam in the set of transmit beams, the channel characteristic for each beam in the set of transmit beams, and the cross-correlation metric between beams in the set of receive beams.

Some examples of the method, apparatus, and non-transitory computer-readable medium described above may further include processes, features, means, or instructions for identifying one or more of a received signal reference power (RSRP), a received signal reference quality (RSRQ), a signal-to-noise ratio (SNR), a signal-to-interference-and-noise ratio (SINR), and a channel quality indicator (CQI) associated with each beam in the set of transmit beams, wherein the channel characteristic comprises at least one of the RSRP, the RSRQ, the SNR, the SINR, or the CQI.

Some examples of the method, apparatus, and non-transitory computer-readable medium described above may further include processes, features, means, or instructions for identifying a number of antenna subarrays of the UE, wherein each subarray may have an associated set of receive beams.

Some examples of the method, apparatus, and non-transitory computer-readable medium described above may further include processes, features, means, or instructions for determining that at least one antenna subarray does not may have any receive beams above the second threshold. Some examples of the method, apparatus, and non-transitory computer-readable medium described above may further include processes, features, means, or instructions for refraining from identifying the set of receive beams for the at least one antenna subarray.

Some examples of the method, apparatus, and non-transitory computer-readable medium described above may further include processes, features, means, or instructions for transmitting the message further comprising an identifier that identifies each beam in the set of transmit beams and the channel characteristic for each beam in the set of transmit beams.

A method of wireless communication is described. The method may include receiving, from a UE, a message that identifies a cross-correlation metric between beams in a set of receive beams, constructing, based at least in part on the message, a channel matrix for a channel used for communicating with the UE, and communicating with the UE according to the channel matrix.

An apparatus for wireless communication is described. The apparatus may include means for receiving, from a UE, a message that identifies a cross-correlation metric between beams in a set of receive beams, means for constructing, based at least in part on the message, a channel matrix for a channel used for communicating with the UE, and means for communicating with the UE according to the channel matrix.

Another apparatus for wireless communication is described. The apparatus may include a processor, memory in electronic communication with the processor, and instructions stored in the memory. The instructions may be operable to cause the processor to receive, from a UE, a message that identifies a cross-correlation metric between beams in a set of receive beams, construct, based at least in part on the message, a channel matrix for a channel used for communicating with the UE, and communicate with the UE according to the channel matrix.

A non-transitory computer readable medium for wireless communication is described. The non-transitory computer-readable medium may include instructions operable to cause a processor to receive, from a UE, a message that identifies a cross-correlation metric between beams in a set of receive beams, construct, based at least in part on the message, a channel matrix for a channel used for communicating with the UE, and communicate with the UE according to the channel matrix.

Some examples of the method, apparatus, and non-transitory computer-readable medium described above may further include processes, features, means, or instructions for receiving the message from a plurality of UEs. Some examples of the method, apparatus, and non-transitory computer-readable medium described above may further include processes, features, means, or instructions for constructing, based at least in part on the message, a channel matrix for each UE of the plurality of UEs. Some examples of the method, apparatus, and non-transitory computer-readable medium described above may further include processes, features, means, or instructions for scheduling, based at least in part on the channel matrix, one or more sets of UEs for communications according to the associated channel matrix for the UE.

Some examples of the method, apparatus, and non-transitory computer-readable medium described above may further include processes, features, means, or instructions for selecting a subset of transmit beams to use for the scheduled communications with the one or more sets of UEs.

Some examples of the method, apparatus, and non-transitory computer-readable medium described above may further include processes, features, means, or instructions for identifying, based at least in part on the message, a channel quality metric for the UE, wherein the channel quality metric comprises information associated with the UE being scheduled for communications along with at least one other UE. Some examples of the method, apparatus, and non-transitory computer-readable medium described above may further include processes, features, means, or instructions for constructing the channel matrix based at least in part on the channel quality metric.

In some examples of the method, apparatus, and non-transitory computer-readable medium described above, the channel quality metric comprises a SINR metric.

DETAILED DESCRIPTION

Aspects of the disclosure are initially described in the context of a wireless communication system. Aspects of the present disclosure provide a mechanism where the base station can optimize such MU-MIMO transmissions to multiple UEs. Generally, the described techniques provide a mechanism to leverage feedback information from a UE in MU-MIMO beam design. For example, the UE may transmit feedback messages to a base station during a beam training phase that identifies the best transmit beam (e.g., the transmit beam index arriving at the UE with the highest RSRP) and the channel characteristic value (e.g., the RSRP for the particular transmit beam). During the beam training phase, the UE may also identify the best receive beams, e.g., the receive beam configuration using UE antenna subarray(s) having the optimal receive signal in terms of receive power, interference level, throughput, etc. As can be appreciated, the best receive beam may have side-beams (e.g., other receive beam configurations) that also receive the beamformed signal, but at a reduced power level, increased interference level, etc. In some aspects, the UE may determine the cross-correlation for the best defined number of receive beams and also feed this information back to the base station. For example, the UE may provide feedback information identifying the top two, four, etc., receive beams and the cross-correlation between the receive beams.

The base station may use the feedback information (e.g., the top K transmit beams, their associated RSRP level, and the cross-correlation metrics for the top receive beams) to construct a channel matrix for the UE. In some aspects, the base station may receive similar feedback messages from all UEs within its coverage area and construct a channel matrix for each UE. In some aspects, the base station may also use other channel characteristics in constructing the channel matrix, e.g., SINR. The base station may then schedule UEs for wireless communications using the channel matrix, where the wireless communications include MU-MIMO transmissions to the selected UEs.

Aspects of the disclosure are further illustrated by and described with reference to apparatus diagrams, system diagrams, and flowcharts that relate to MU-MIMO transmissions in mmW systems.

Figure 1:
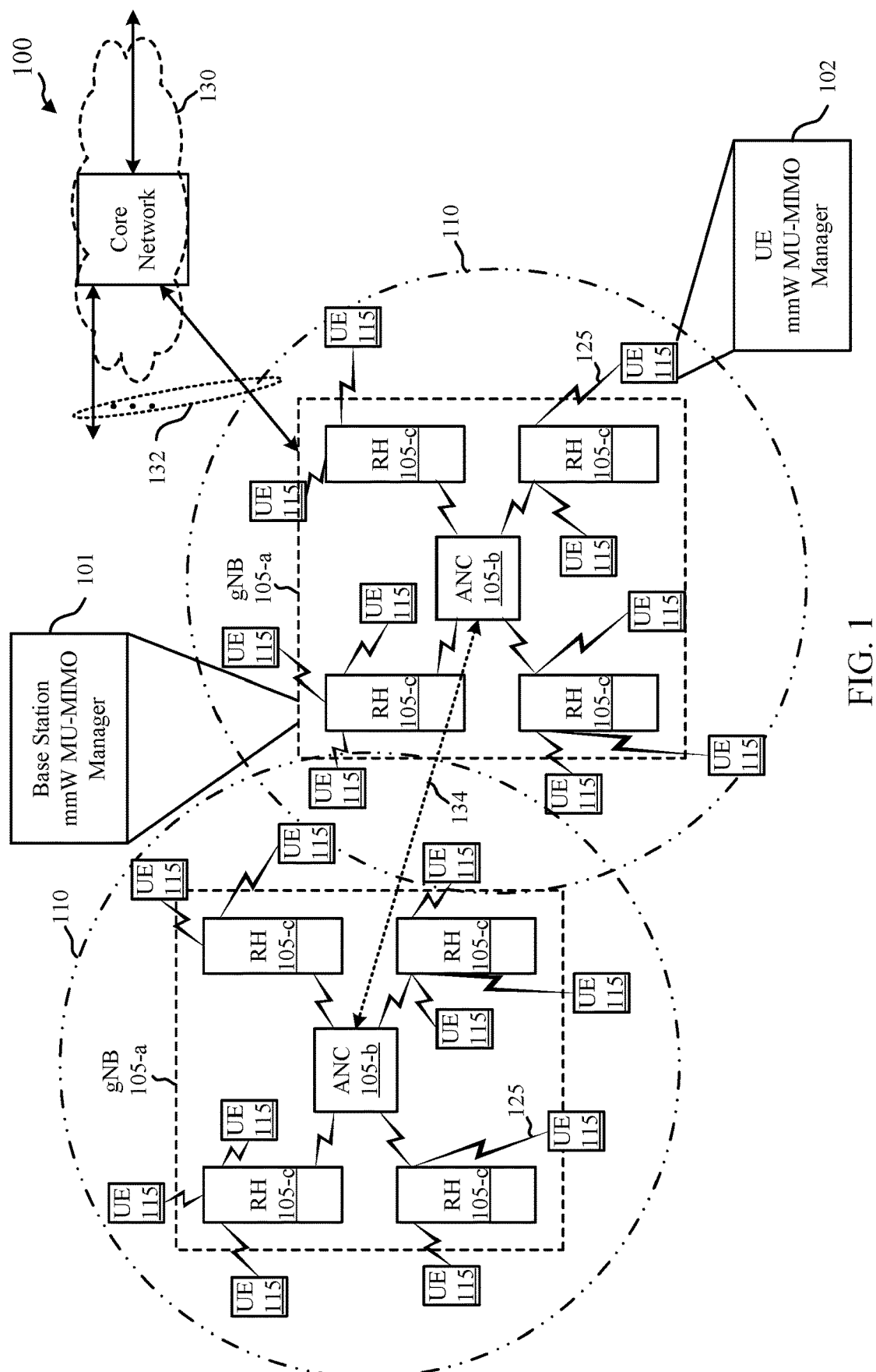
FIG. 1 illustrates an example of a system for wireless communication that supports MU-MIMO transmissions in mmW systems, in accordance with one or more aspects of the present disclosure.

FIG. 1 illustrates an example of a wireless communication system 100, in accordance with one or more aspects of the present disclosure. The wireless communication system 100 includes base stations 105 (e.g., gNodeBs (gNBs) 105-*a* including access node controller(s) (ANC)(s) 105-*b*, and/or radio heads (RHs) 105-*c*), UEs 115, and a core network 130. In some examples, the wireless communication system 100 may be a Long Term Evolution (LTE), LTE-Advanced (LTE-A) network, or a New Radio (NR) network. In some cases, wireless communication system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communication system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communication system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115 or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity 105-b, which may be an example of an access node controller (ANC). Each access network entity 105-b may communicate with a number of UEs 115 through a number of other access network transmission entities 105-c, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight and may be blocked by buildings and environmental features. However, the waves may penetrate walls sufficiently to provide service to UEs 115 located indoors.

Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input/multiple-output (MIMO) wireless systems use a transmission scheme between a transmitter (e.g., a base station 105) and a receiver (e.g., a UE 115), where both transmitter and receiver are equipped with multiple antennas. Some portions of wireless communication system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may include multiple use antennas or antenna arrays to conduct beamforming operations for directional communications with a UE 115.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat Request (HARD) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s = 1/30{,}720{,}000$ seconds). Time resources may be organized according to radio frames of length of 10 ms (Tf=307200 Ts), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communication system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communication system 100 may utilize both licensed and unlicensed radio frequency spectrum bands. For example, wireless communication system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD or a combination of both.

In some aspects, a base station 105 may include a base station mmW MU-MIMO manager 101. The base station mmW MU-MIMO manager 101 may receive, from a UE 115, a message that identifies a cross-correlation metric between beams in a set of receive beams. The base station mmW MU-MIMO manager 101 may construct, based at least in part on the message, a channel matrix for a channel used for communicating with the UE 115. The base station mmW MU-MIMO manager 101 may communicate with the UE 115 according to the channel matrix.

In some aspects, a UE 115 may include a UE mmW MU-MIMO manager 102. The UE mmW MU-MIMO manager 102 may identify a set of transmit beams having a channel characteristic above a first threshold, the set of transmit beams comprising an ordered list of transmit beams based on the associated channel characteristic of each transmit beam. The UE mmW MU-MIMO manager 102 may determine, based at least in part on the set of transmit beams, a cross-correlation metric between a set of receive beams, the set of receive beams comprising an ordered list of receive beam configurations with channel characteristic above a second threshold. The UE mmW MU-MIMO manager 102 may transmit a message that identifies the cross-correlation metric between beams in the set of receive beams.

Figure 2:
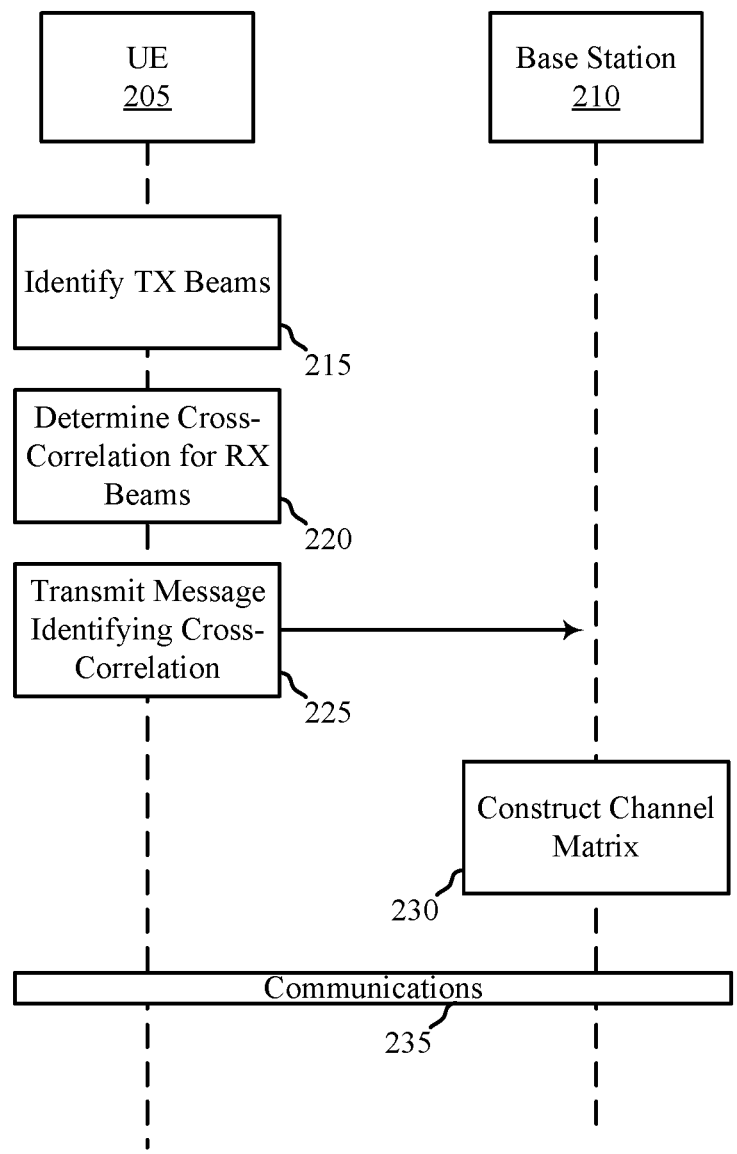
FIG. 2 illustrates an example of a process that supports MU-MIMO transmissions in mmW systems, in accordance with one or more aspects of the present disclosure.

FIG. 2 illustrates an example of a process 200 that supports MU-MIMO transmissions in mmW systems, in accordance with one or more aspects of the present disclosure. In some examples, process 200 may implement aspects of wireless communication system 100. Process 200 may include a UE 205 and a base station 210, which may be examples of the corresponding devices described herein. Generally, process 200 illustrates one example of MU-MIMO scheduling in a mmW wireless communication system.

Generally, base station 210 may have a larger number of antennas than UE 205 (e.g., an 8×8, or 8×16 planar array at the base station 210), where UE 205 may have multiple antenna subarrays (e.g., 4 or 6) for diversity reasons. There may be a small number of antennas in each subarray (e.g., 2 to 8). Moreover, each device may have multiple radio frequency (RF) chains (e.g., analog-digital converters/digital-to-analog converters (ADC/DACs), up/down converters, power amplifiers (Pas), low-noise amplifiers (LNAs), and the like). In one non-limiting example, base station may have between one and eight whereas the UE may have one to four RF chains. The multiple RF chains may be used to serve multiple UEs or multiple streams/layers to a smaller set of UEs. Aspects of process 200 may support signaling schemes to enable MU-MIMO transmissions.

In some aspects, scheduling schemes may be used for MU-MIMO transmissions. Common scheduling schemes may include, but are not limited to a round-robin scheduler, a proportionate fair scheduler, etc. Process 200 illustrates one example of leveraging the directional properties of mmW channels via a directional scheduler. For example, for each $UE_i$, a potentially allowable set of simultaneously schedulable UEs may be found using:

$$A_i = \{j : |AoD(\phi_{UE_i}) - AoD(\phi_{UE_j})| > \phi_{min} \text{ and } |P_{dom,UE_i} - P_{dom,UE_j}| < P_{max}\}$$

where AoD refers to the angle of departure in the azimuth, $P_{dom}$ refers to the transmit power for each respective UE, and $P_{max}$ refers to the maximum available transmit power of base station 210. An admissible set may include a random UE from $A_i$ is eligible to be scheduled with $UE_j$. In some aspects, the best UE from $A_i$ that maximizes (e.g., weighted) sum-rate (or an appropriate network performance metric) may be scheduled with $UE_i$.

In some aspects, a directional beamforming schemes may be defined per channel. For example, $H_i$ may represent the channel from the mmW base station (e.g., base station 210) and $UE_i$ (e.g., UE 205). The base station 210 may, e.g., during a beam training phase, run through training beams denoted as $f_{Tr,1}, \ldots, f_{Tr,N}$. Each UE may run through its specific codebook of beams: $g_{Tr,1}^{(i)}, \ldots, g_{Tr,M}^{(i)}$. $UE_i$ may convey beam indices $j_1^{(i)}$ and $k_1$ to the base station 210 satisfying:

$$(f_1^{(i)}, k_1) = \arg\max_{j=1,\ldots,N, k=1,\ldots,M} |(g_{Tr,k}^{(i)})^H H_i f_{Tr,j}|^2.$$

In some aspects, UE 205 may provide feedback information identifying the top-4 transmit beam information (e.g., top four transmit beams having the highest RSRP) and their RSRP values. For MU-MIMO, base station 210 may use $f_{Tr,j_1}^{(i)}$ from all the UEs to generate either a MU-MIMO beam designed based on, for example, beam steering, zero-forcing, or generalized eigenvector principles. In some aspects, the top-K beam information that is fed back from each UE in MU-MIMO beam design may be leveraged for improved MU-MIMO transmissions.

At 215, UE 205 may identify the transmit beams having a channel characteristic above a first threshold. For example, the UE 205 may identify the top K transmit beams having a RSRP, a received signal reference quality (RSRQ), a signal-to-noise ratio (SNR), a signal-to-interference-and-noise ratio (SINR), a channel quality indicator (CQI), and the like, above a threshold value. In some examples, UE 205 may identify the best transmit beams in an ordered list starting with the transmit beam having the highest RSRP, the second highest RSRP next, and so on. References to a list or ordered list may include information stored or otherwise accessible by UE 205 that identifies the best transmit beams (e.g., the transmit beams having channel characteristics above the threshold). The list or ordered list may include any information stored or otherwise accessible that identifies the transmit beams directly and/or indirectly (e.g., via a reference to a lookup table, reference to an RSRP value, etc.). The list or ordered list may be stored in a table in or out of sequence and/or a particular set of transmit beams having channel characteristic above the threshold may be associated with an entry or index number.

In some aspects, UE 205 may identify the top K transmit beam indices $j_m^{(i)}$ (m=1, ..., K) along with associated $RSRP_m^{(i)}$. In some aspects, the transmit beam $RSRP_1^{(i)} \geq \ldots \geq RSRP_K^{(i)}$ with:

$$RSRP_m^{(i)} = |(g_{Tr,k_m}^{(i)})^H H_i f_{Tr,j_m}^{(i)}|^2.$$

In some aspects, K may be four.

In some aspects, UE 205 may identify the set of transmit beams during a beam training phase. The beam training phase may be performed on a mmW channel, e.g., a mmW data channel. In some aspects, UE 205 may transmit feedback information in a message using a channel that is different from the channel that UE 205 performs the beam training phase on. For example, UE 205 may use a control channel to transmit the feedback information on, a non-mmW channel (e.g., sub-6 GHz channel), and the like to transmit the feedback information.

At 220, UE 205 may determine the cross-correlation metric between receive beams. The receive beams may be an ordered list of receive beam configurations having a channel characteristic above a second threshold. In some aspects, the set of receive beams may include the best receive beams, e.g., the receive beams having the highest RSRP and the like.

In some aspects, UE 205 may determine the cross-correlation metric for the UE side beams using:

$$\rho_m^{(i)} = (g_{Tr,k_1}^{(i)})^H g_{Tr,k_m}^{(i)}, \, m=2, \ldots, K$$

In some examples, $\rho_1^{(i)}=1$ may be discarded.

In some aspects, UE 205 may identify receive beams based on an antenna subarray. For example, UE 205 may identify a set of receive beams for each antenna subarray that has a receive beam above the second threshold. UE 205 may omit receive beam sets for antenna subarrays that do not have a receive beam above the second threshold, e.g., due to blockage of the subarray.

At 225, UE 205 may transmit (and base station 210 may receive) a message identifying the cross-correlation metric between the beams in the set of receive beams. In some examples, the message may be a feedback message and may be transmitted on a channel other than the channel that the beam training phase was performed on, e.g., on a control channel, a sub-6 GHz channel, and the like. In some aspects, the message may also include an identification of the set of transmit beams having the channel characteristic above the threshold (e.g., the top-4 K transmit beams). In some aspects, the message may also include the channel characteristic value for each beam in the set of transmit beams, e.g., the RSRP value.

At 230, base station 210 may construct a channel matrix for a channel used for communicating with UE 205. The channel matrix may be constructed based on the message received from UE 205 (e.g., based on the cross-correlation metric). In some aspects, a cluster model for a mmW channel matrix may be defined using:

$$H_i = \sum_{\ell=1}^{L_i} \alpha_\ell^{(i)} a_R(\theta_{R,\ell}^{(i)}, \phi_{R,\ell}^{(i)}) \cdot a_T(\theta_{R,\ell}^{(i)}, \phi_{R,\ell}^{(i)})^H$$

where $L_i$ refers to the number of clusters, $\alpha_I^{(i)}$ refers to the gain of the I-th cluster including phase, $\theta_{R,I}^{(i)}$ refers to the angle of arrival in the zenith (e.g., elevation), $\phi_{R,I}^{(i)}$ refers to the angle of departure in the azimuth (e.g., angle), and $\alpha_I(\theta_{R,I}^{(i)}, \phi_{R,I}^{(i)})^H$ refers the angles of departure (zenith and azimuth, respectively).

In some aspects, the base station 210 may construct the channel matrix based on the UE 205 feedback using:

$$\hat{H}_i = \sum_{m=1}^{K} \sqrt{RSRP_m^{(i)}} \cdot g_{Tr,km}^{(i)} (f_{Tr,jm}^{(i)})^H.$$

Generally, this reconstruction may provide a rank-K approximation of $H_i$ and captures the top-K transmit beams from the codebook (e.g., provide up to codebook resolution) and with no intra-beam phase relations captured.

However, in accordance with aspects of the present disclosure, base station 210 may also consider SINR optimization instead for a S-user transmission ($S \leq N_t$). The system model for $UE_i$ (e.g., UE 205) may be:

$$y_i = g_i^H \cdot \left[ H_i \cdot \left( \sum_{m=1}^{S} \sqrt{P_m} f_m s_m \right) + n_i \right], i = 1, \ldots, S$$

where $g_i^H$ refers to the combiner at $UE_i$, $H_i$ refers to the channel, $f_m$ refers to the beam for the m-th UE, $s_m$ refers to the data symbol for the m-th UE, and $n_i$ refers to additive noise (e.g., CN(0,1)).

In some aspects, base station 210 may, when determining the $SINR_i$ are $UE_i$, treat MU-interference as noise using:

$$SINR_i = \frac{P_i \cdot |g_i^H H_i f_i|^2}{1 + \sum_{m \neq i} P_m \cdot |g_i^H H_i f_m|^2}$$

wherein $f_m$, m=1..., S is designed to minimize/reduce the denominator term as much as possible. In some aspects, base station 210 may let $UE_i$ use $g_{Tr,k1}^{(i)}$ based on a UE-specific training codebook for combining and reception of MU transmission. For a zero-forcing solution, $f_m$ may be designed such that $|(g_{Tr,K1}^{(i)})^H H_i f_m| \approx 0$ for $m \neq i$. Moreover, since base station 210 may now know $H_i$ perfectly, base station 210 may design $f_m$ to ensure that $|(g_{Tr,K1}^{(i)})^H \hat{H}_i f_m| \approx 0$ for $m \neq i$. This may be simplified as:

$$\left| (g_{Tr,K1}^{(i)})^H \cdot \left[ \sum_{m=1}^{K} \sqrt{RSRP_m^{(i)}} \cdot g_{Tr,km}^{(i)} (f_{Tr,jm}^{(i)})^H \right] \cdot f_m \right| \approx 0 \text{ for } m \neq i$$

$$\Rightarrow \left| \left[ \sum_{m=1}^{K} p_m^{(i)} \sqrt{RSRP_m^{(i)}} \cdot (f_{Tr,jm}^{(i)})^H \right] \cdot f_m \right| \approx 0 \text{ for } m \neq i.$$

In some aspects, base station 210 may follow a zeroforcing type solution to define the following $S \times N_t$ matrix:

$$\hat{\mathcal{H}}|_{S \times N_t} = \begin{bmatrix} \sum_{m=1}^{K} p_m^{(1)} \sqrt{RSRP_m^{(1)}} \cdot (f_{Tr,jm}^{(1)})^H \\ \vdots \\ \sum_{m=1}^{K} p_m^{(S)} \sqrt{RSRP_m^{(S)}} \cdot (f_{Tr,jm}^{(S)})^H \end{bmatrix}$$

and for $f_m$, use the unit-norm column vectors of the $N_t \times S$ matrix $$\hat{\mathcal{H}}^H \cdot (\hat{\mathcal{H}} \hat{\mathcal{H}}^H)^{-1}$$

In some aspects, the same technique may be generalized to address a simultaneous optimization of numerator and denominator terms of $SINR_i$ (e.g., as in a generalized eigenvector solution). UE 205 may have multiple antenna subarrays covering different regions and with different antenna dimensions. The described techniques may be used to determine and communicate correlation information of the top-K beams for each subarray. In this setting, K that is useful may correspond to the number of dominant clusters seen by that subarray. In some aspects, S can be small (e.g., S=2) in which case the matrix inversion may be performed in a more efficient manner. The described beam design may be used across any scheduler that schedules S UEs (e.g., proportional fair, round-robin, directional, directional clustering and partitioning via beam grouping, etc.) In some aspects, the UE 205 codebook correlation information may be fed back to base station 210 on a slow rate channel, e.g., a mmW NR physical uplink control channel (PUCCH), an LTE/sub-6 GHz NR PUCCH and/or LTE physical uplink shared channel (PUSCH), or any other low-rate links, and UE 205 may select the K–1 correlation indices from this information via instantaneous feedback.

At 235, UE 205 and base station 210 may communicate using the channel matrix. For example, the UE 205 and/or the base station 210 may select transmit and receive beams according to the channel matrix.

In some aspects, UE 205 may only feedback correlation information of beams estimated from its codebook, rather than the codebook itself. The additional information allows base station 210 to reconstruct a rank-K estimate of the channel matrix which is a significantly better estimation process (e.g., better than reconstructing a rank-1 approximation). A rank-K approximation takes into account strong beams from multiple directions (if any) to design multi-user beams. The described techniques may reduce to a legacy scheme if K=1. The described techniques provide improved MU rates at the cost of minimal feedback overhead.

Figure 3:
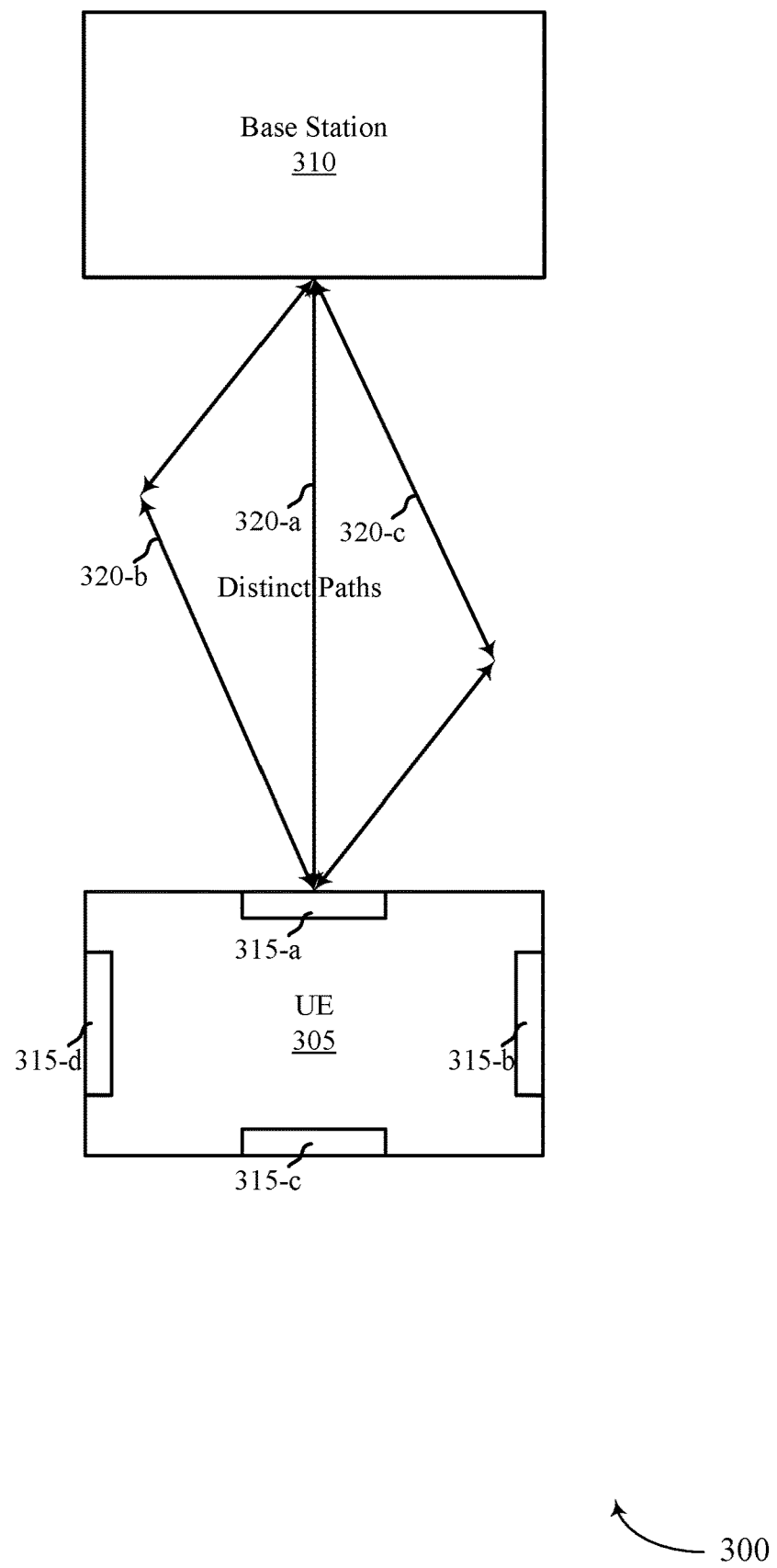
FIG. 3 illustrates an example of a system for wireless communication that supports MU-MIMO transmissions in mmW systems, in accordance with one or more aspects of the present disclosure.

FIG. 3 illustrates an example of a wireless communication system 300 that supports MU-MIMO transmissions in mmW systems, in accordance with one or more aspects of the present disclosure. In some examples, wireless communication system 300 may implement aspects of wireless communication system 100 and/or process 200. Wireless communication system 300 may include a UE 305 and a base station 310, which may be examples of the corresponding devices described herein.

UE 305 may include a plurality of antenna subarrays 315 (labeled as antenna subarrays 315-a, 315-b, 315-c, and 315-d). Although FIG. 3 shows UE 305 having four antenna subarrays 315, it is to be understood that UE 305 may have more or fewer antenna subarrays 315 and/or such antenna subarrays 315 may be located at different positions of UE 305. UE 305 may use different antenna subarrays 315 to form a transmit beam (e.g., when transmitting beamformed signals to base station 310) and/or a receive beam (e.g., when configuring the antenna subarrays in a distinct configuration to receive a signal transmitted from base station 310).

Wireless communications between UE 305 and base station 310 may include a plurality of paths 320, wherein each path 320 may refer to a transmit beam and/or receive beam used by the respective devices. As illustrated in FIG. 3, transmitted signals may include one or more paths 320 that are direct and/or indirect. In some instances, a direct path 320 may be received at the receiving end with a higher RSRP than an indirect path 320. In other instances, the indirect path 320 may be received with a higher RSRP than the direct path 320.

In some aspects, the different paths 320 may include one or more transmit and/or receive beams that have a channel characteristic above a threshold, e.g., a high RSRP value. Certain paths 320 may be associated with transmit and/or receive beams that have a channel characteristic below another threshold, e.g., a low RSRP value. Accordingly, UE 305 may identify the set of transmit beams having a channel characteristic above a threshold based on receiving the beams via one or more paths 320. Further, UE 305 may identify receive beams (e.g., antenna subarray 320 configurations) having a channel characteristic below a threshold. UE 305 may also determine the cross-correlation metric between receive beams. The UE 305 may transmit a message to the base station 310 (e.g., a feedback message) indicating or otherwise identifying the cross-correlation metric and, in some instances, the set of transmit beams and their associated channel characteristic value (e.g., RSRP value). Base station 310 may receive the message from the UE 305 (and in some instances multiple UEs associated with base station 310) and construct the channel matrix in accordance with the described aspects.

Figure 4:
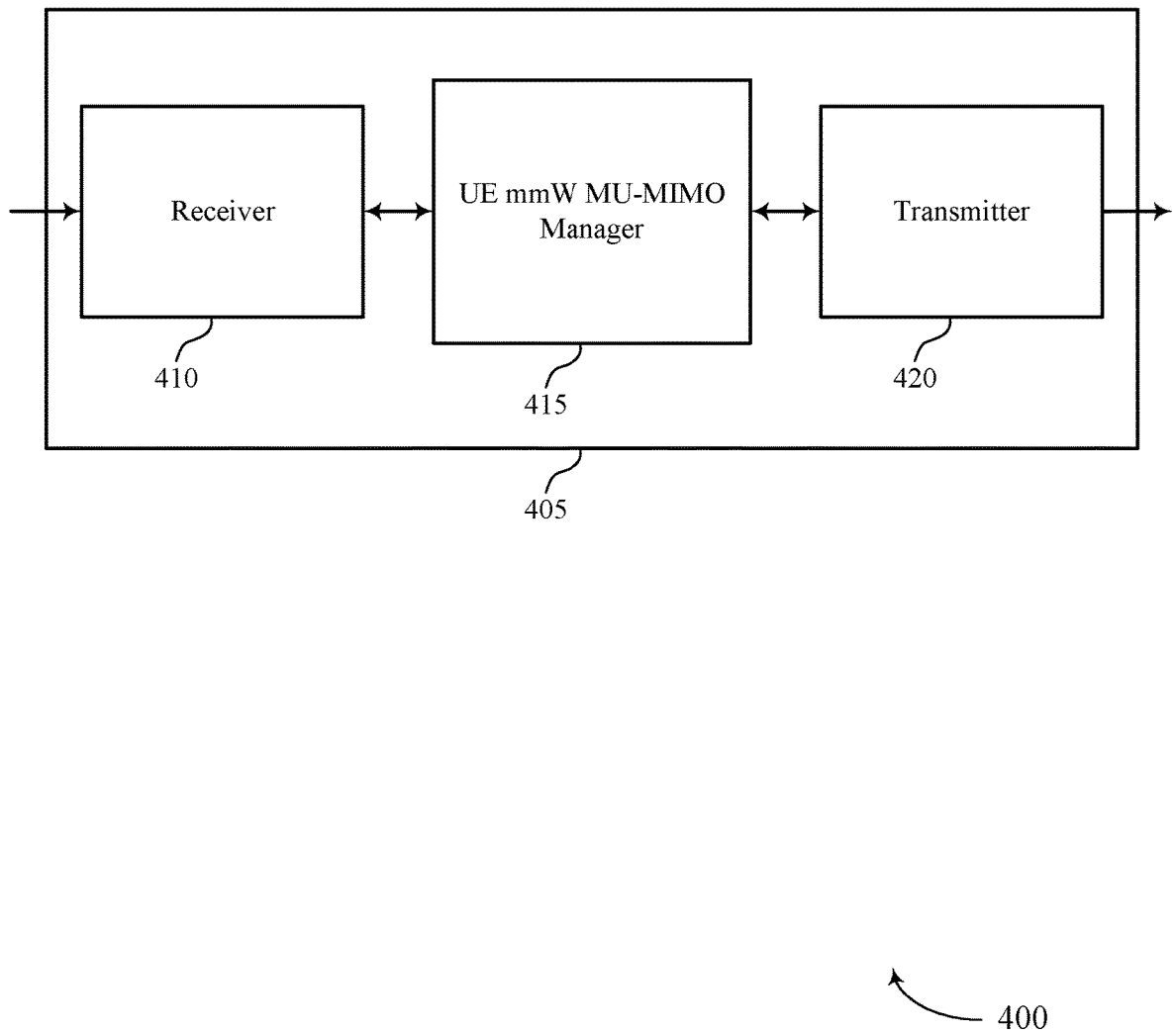
FIGS. 4 through 6 show block diagrams of a device that supports MU-MIMO transmissions in mmW systems, in accordance with one or more aspects of the present disclosure.

FIG. 4 shows a block diagram 400 of a wireless device 405 that supports MU-MIMO transmissions in mmW systems, in accordance with one or more aspects of the present disclosure. Wireless device 405 may be an example of aspects of a UE 115 as described herein. Wireless device 405 may include receiver 410, UE mmW MU-MIMO manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to MU-MIMO transmissions in mmW systems, etc.). Information may be passed on to other components of the device. The receiver 410 may be an example of aspects of the transceiver 735 described with reference to FIG. 7. The receiver 410 may utilize a single antenna or a set of antennas.

UE mmW MU-MIMO manager 415 may be an example of aspects of the UE mmW MU-MIMO manager 715 described with reference to FIG. 7.

UE mmW MU-MIMO manager 415 and/or at least some of its various sub-components may be implemented in hardware, software executed by a processor, firmware, or any combination thereof. If implemented in software executed by a processor, the functions of the UE mmW MU-MIMO manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE mmW MU-MIMO manager 415 and/or at least some of its various sub-components may be physically located at various positions, including being distributed such that portions of functions are implemented at different physical locations by one or more physical devices. In some examples, UE mmW MU-MIMO manager 415 and/or at least some of its various sub-components may be a separate and distinct component in accordance with various aspects of the present disclosure. In other examples, UE mmW MU-MIMO manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE mmW MU-MIMO manager 415 may identify a set of transmit beams having a channel characteristic above a first threshold, the set of transmit beams including an ordered list of transmit beams based on the associated channel characteristic of each transmit beam. UE mmW MU-MIMO manager 415 may determine, based on the set of transmit beams, a cross-correlation metric between a set of receive beams, the set of receive beams including an ordered list of receive beam configurations with channel characteristic above a second threshold. UE mmW MU-MIMO manager 415 may transmit a message that identifies the cross-correlation metric between beams in the set of receive beams.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Figure 5:
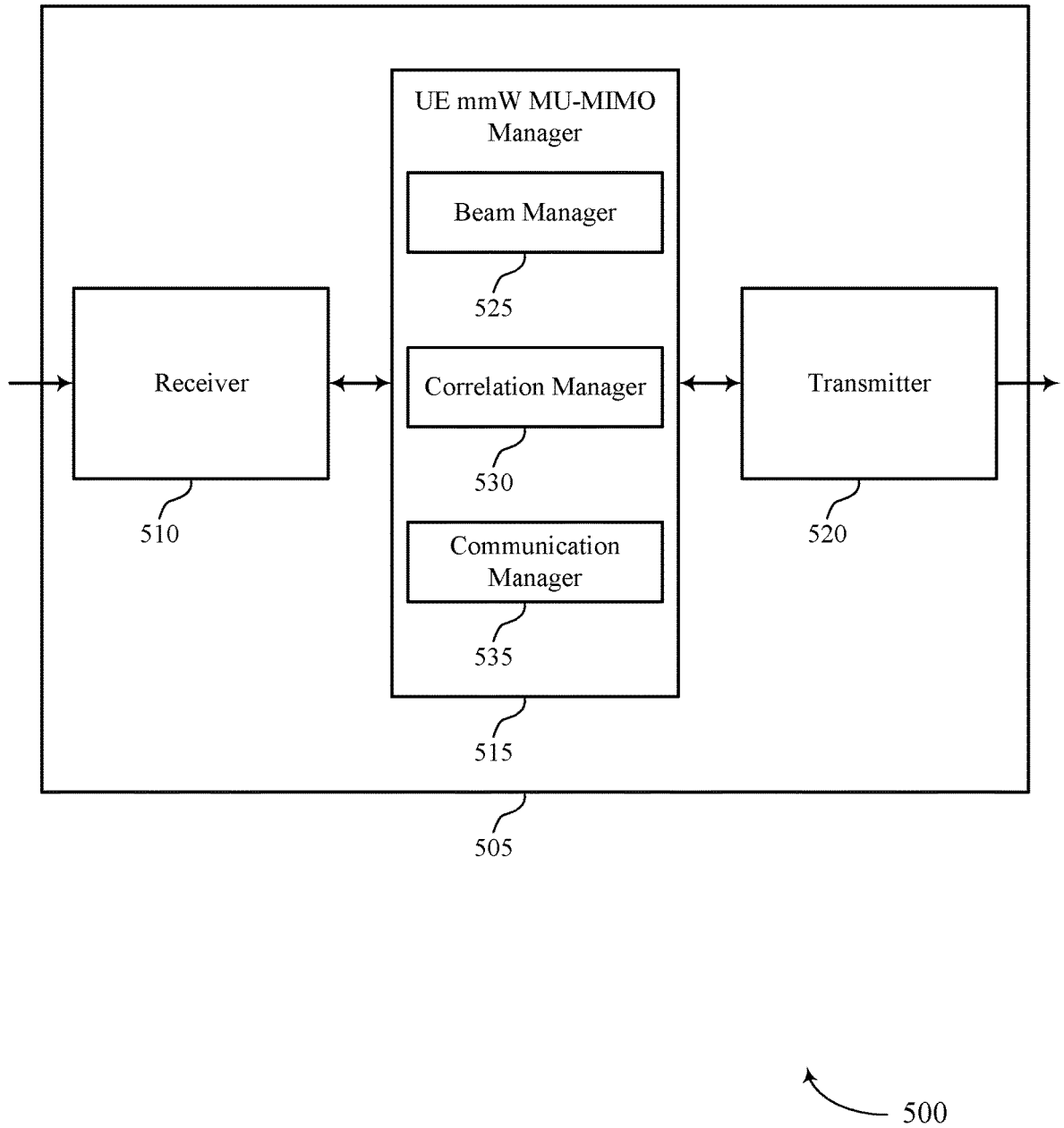

FIG. 5 shows a block diagram 500 of a wireless device 505 that supports MU-MIMO transmissions in mmW systems, in accordance with one or more aspects of the present disclosure. Wireless device 505 may be an example of aspects of a wireless device 405 or a UE 115 as described herein. Wireless device 505 may include receiver 510, UE mmW MU-MIMO manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to MU-MIMO transmissions in mmW systems, etc.). Information may be passed on to other components of the device. The receiver 510 may be an example of aspects of the transceiver 735 described with reference to FIG. 7. The receiver 510 may utilize a single antenna or a set of antennas.

UE mmW MU-MIMO manager 515 may be an example of aspects of the UE mmW MU-MIMO manager 715 described with reference to FIG. 7. UE mmW MU-MIMO manager 515 may also include beam manager 525, correlation manager 530, and communication manager 535.

Beam manager 525 may identify a set of transmit beams having a channel characteristic above a first threshold, the set of transmit beams including an ordered list of transmit beams based on the associated channel characteristic of each transmit beam.

Correlation manager 530 may determine, based on the set of transmit beams, a cross-correlation metric between a set of receive beams, the set of receive beams including an ordered list of receive beam configurations with channel characteristic above a second threshold.

Communication manager 535 may transmit a message that identifies the cross-correlation metric between beams in the set of receive beams and transmit the message further including an identifier that identifies each beam in the set of transmit beams and the channel characteristic for each beam in the set of transmit beams.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
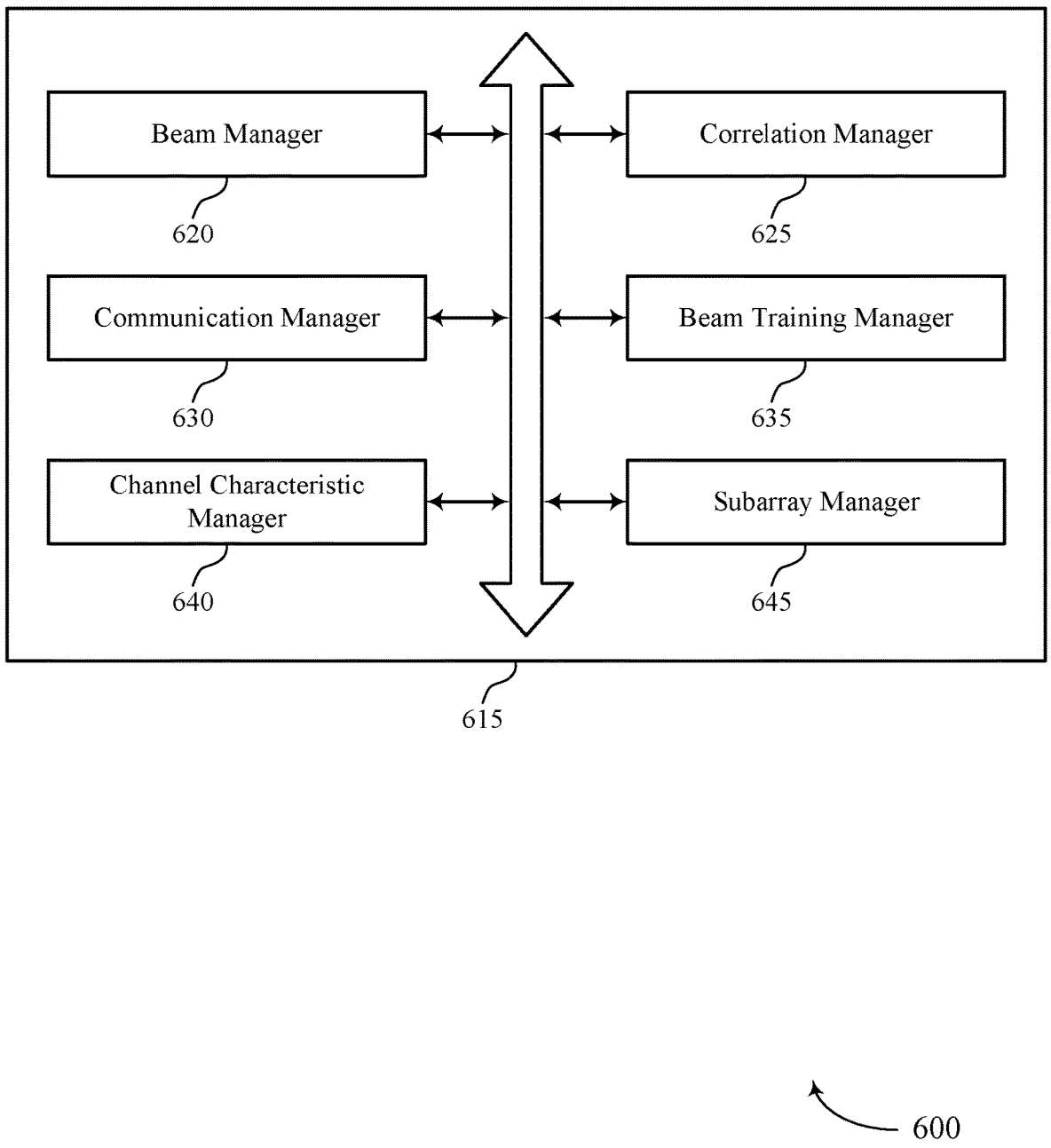

FIG. 6 shows a block diagram 600 of a UE mmW MU-MIMO manager 615 that supports MU-MIMO transmissions in mmW systems, in accordance with one or more aspects of the present disclosure. The UE mmW MU-MIMO manager 615 may be an example of aspects of a UE mmW MU-MIMO manager 415, a UE mmW MU-MIMO manager 515, or a UE mmW MU-MIMO manager 715 described with reference to FIGS. 4, 5, and 7. The UE mmW MU-MIMO manager 615 may include beam manager 620, correlation manager 625, communication manager 630, beam training manager 635, channel characteristic manager 640, and subarray manager 645. Each of these modules may communicate, directly or indirectly, with one another (e.g., via one or more buses).

Beam manager 620 may identify a set of transmit beams having a channel characteristic above a first threshold, the set of transmit beams including an ordered list of transmit beams based on the associated channel characteristic of each transmit beam.

Correlation manager 625 may determine, based on the set of transmit beams, a cross-correlation metric between a set of receive beams, the set of receive beams including an ordered list of receive beam configurations with channel characteristic above a second threshold.

Communication manager 630 may transmit a message that identifies the cross-correlation metric between beams in the set of receive beams and transmit the message further including an identifier that identifies each beam in the set of transmit beams and the channel characteristic for each beam in the set of transmit beams.

Beam training manager 635 may perform a beam training phase between the UE and a base station to identify the set of transmit beams and the set of receive beams. Beam training manager 635 may perform the beam training phase using a first channel, and transmit the message using a second channel, where the second channel is associated with a lower data rate with respect to the first channel. That is, the first channel may be a high-rate data channel and the second channel may be a low-rate data channel. In some cases, the first channel includes a millimeter wave channel and the second channel includes a sub-6 GHz channel. In some cases, the first channel includes a millimeter wave data channel and the second channel includes a millimeter wave control channel.

Channel characteristic manager 640 may transmit a codebook entry to indicate the identifier of each beam in the set of transmit beams, the channel characteristic for each beam in the set of transmit beams, and the cross-correlation metric between beams in the set of receive beams and identify one or more of a RSRP, a RSRQ, a SNR, a SINR, and a CQI associated with each beam in the set of transmit beams, where the channel characteristic includes at least one of the RSRP, the RSRQ, the SNR, the SINR, or the CQI.

Subarray manager 645 may identify a number of antenna subarrays of the UE, where each subarray has an associated set of receive beams. Subarray manager 645 may determine that at least one antenna subarray does not have any receive beams above the second threshold. Subarray manager 645 may refrain from identifying the set of receive beams for the at least one antenna subarray.

Figure 7:
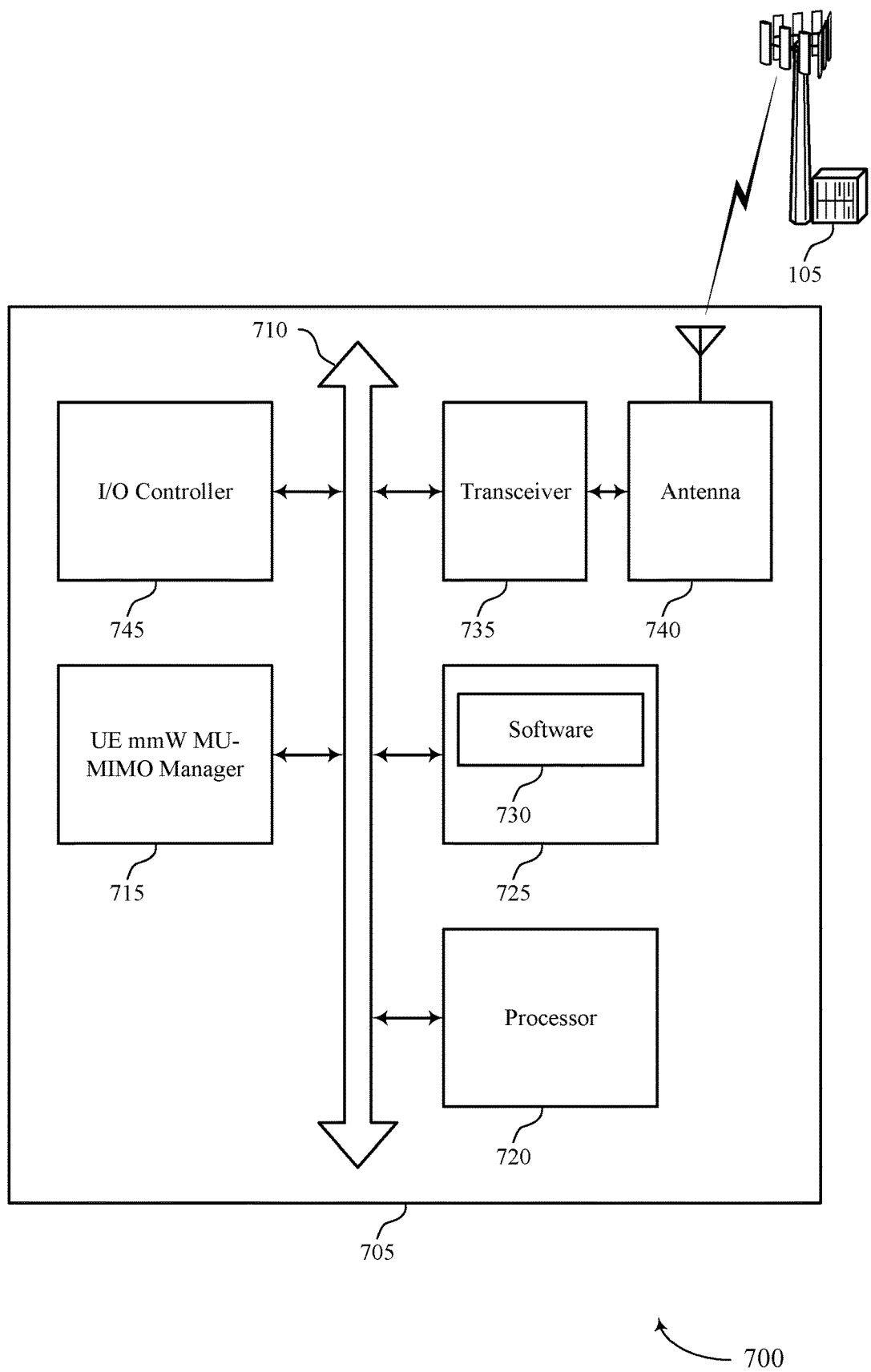
FIG. 7 illustrates a block diagram of a system including a UE that supports MU-MIMO transmissions in mmW systems, in accordance with one or more aspects of the present disclosure.

FIG. 7 shows a diagram of a system 700 including a device 705 that supports MU-MIMO transmissions in mmW systems, in accordance with one or more aspects of the present disclosure. Device 705 may be an example of or include the components of wireless device 405, wireless device 505, or a UE 115 as described herein. Device 705 may include components for bi-directional voice and data communications including components for transmitting and receiving communications, including UE mmW MU-MIMO manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting MU-MIMO transmissions in mmW systems).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support MU-MIMO transmissions in mmW systems. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
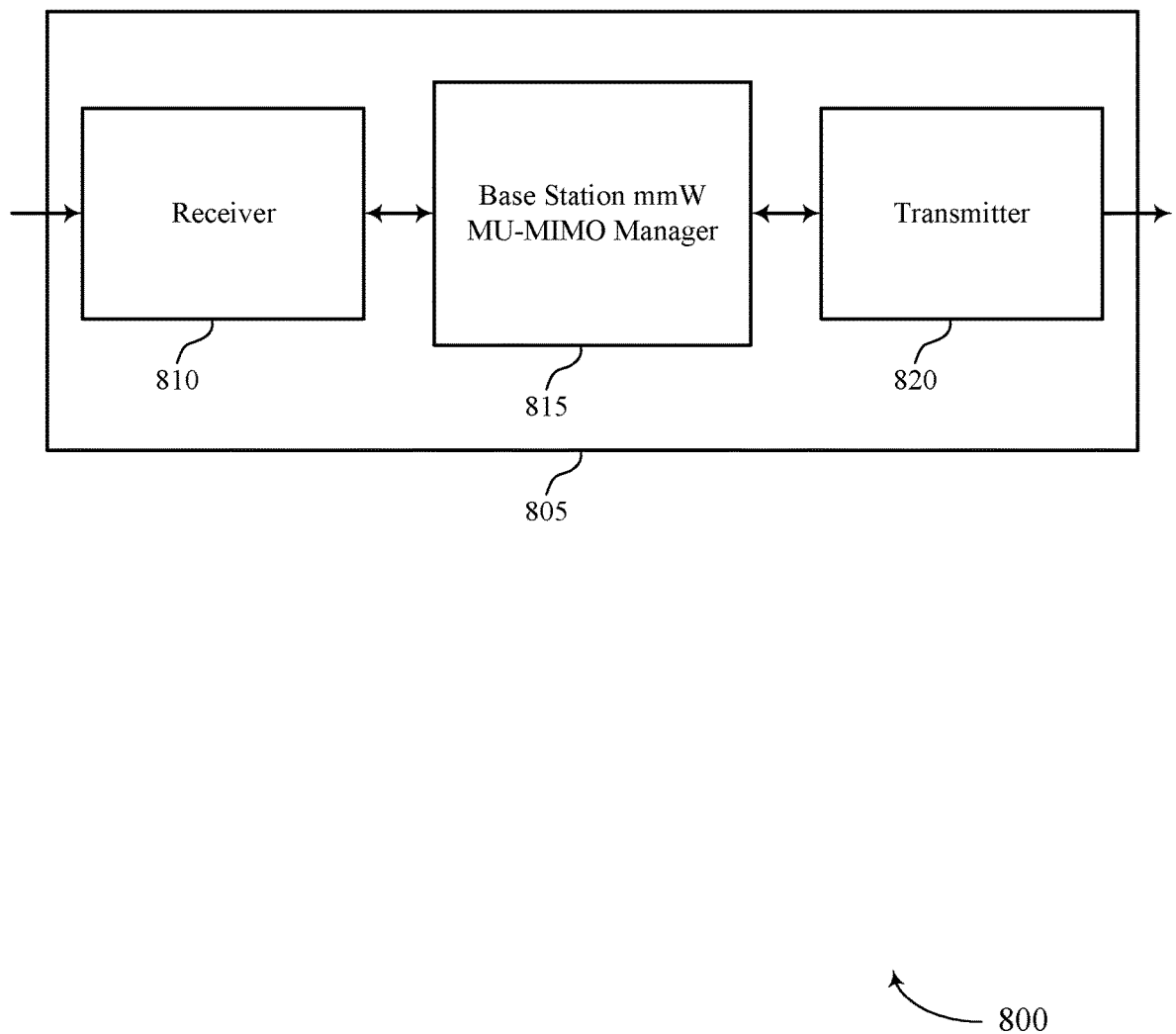
FIGS. 8 through 10 show block diagrams of a device that supports MU-MIMO transmissions in mmW systems, in accordance with one or more aspects of the present disclosure.

FIG. 8 shows a block diagram 800 of a wireless device 805 that supports MU-MIMO transmissions in mmW systems, in accordance with one or more aspects of the present disclosure. Wireless device 805 may be an example of aspects of a base station 105 as described herein. Wireless device 805 may include receiver 810, base station mmW MU-MIMO manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to MU-MIMO transmissions in mmW systems, etc.). Information may be passed on to other components of the device. The receiver 810 may be an example of aspects of the transceiver 1135 described with reference to FIG. 11. The receiver 810 may utilize a single antenna or a set of antennas.

Base station mmW MU-MIMO manager 815 may be an example of aspects of the base station mmW MU-MIMO manager 1115 described with reference to FIG. 11.

Base station mmW MU-MIMO manager 815 and/or at least some of its various sub-components may be implemented in hardware, software executed by a processor, firmware, or any combination thereof. If implemented in software executed by a processor, the functions of the base station mmW MU-MIMO manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station mmW MU-MIMO manager 815 and/or at least some of its various sub-components may be physically located at various positions, including being distributed such that portions of functions are implemented at different physical locations by one or more physical devices. In some examples, base station mmW MU-MIMO manager 815 and/or at least some of its various sub-components may be a separate and distinct component in accordance with various aspects of the present disclosure. In other examples, base station mmW MU-MIMO manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station mmW MU-MIMO manager 815 may receive, from a UE, a message that identifies a cross-correlation metric between beams in a set of receive beams. Base station mmW MU-MIMO manager 815 may construct, based on the message, a channel matrix for a channel used for communicating with the UE. Base station mmW MU-MIMO manager 815 may communicate with the UE according to the channel matrix.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
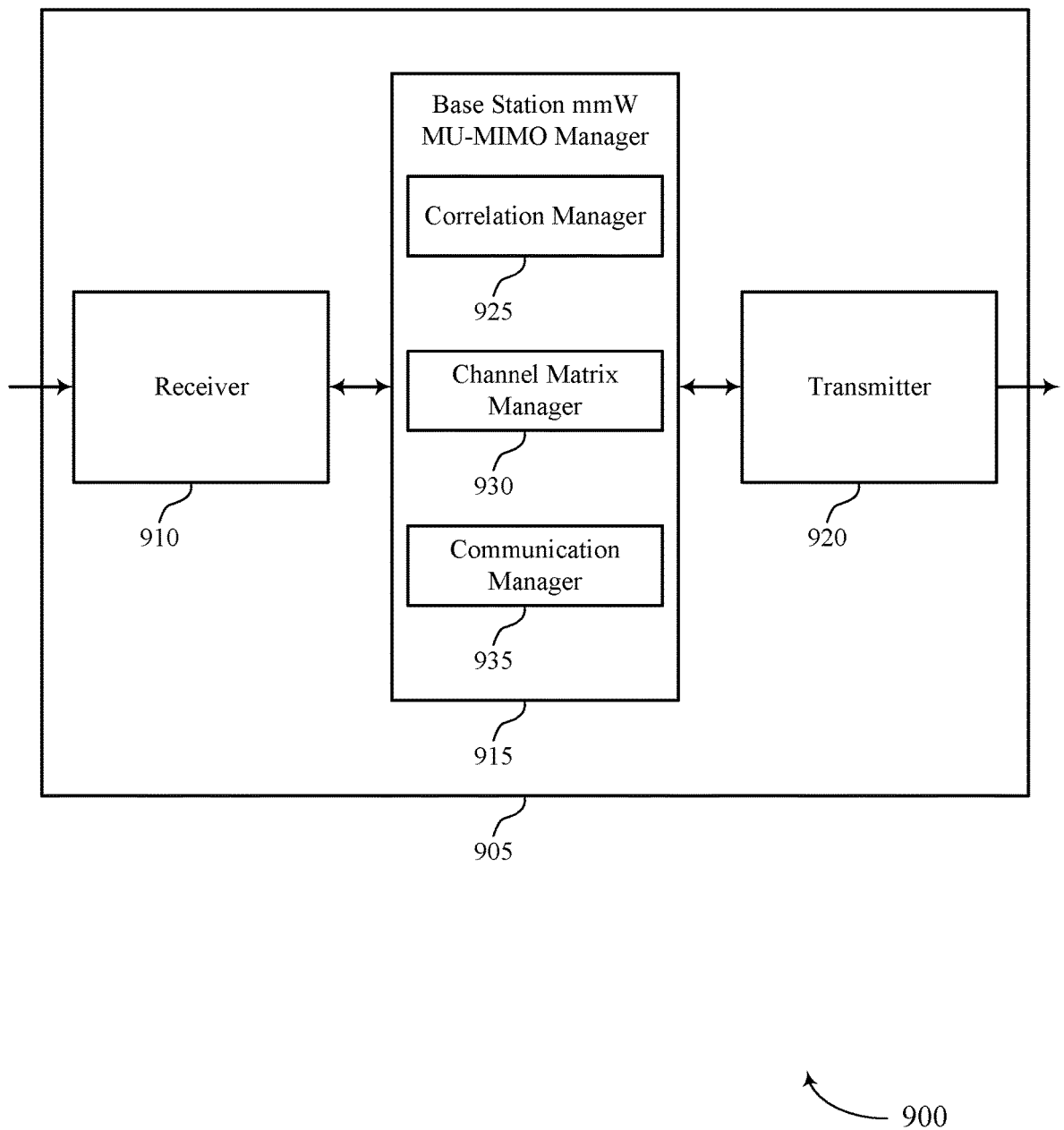

FIG. 9 shows a block diagram 900 of a wireless device 905 that supports MU-MIMO transmissions in mmW systems, in accordance with one or more aspects of the present disclosure. Wireless device 905 may be an example of aspects of a wireless device 805 or a base station 105 as described herein. Wireless device 905 may include receiver 910, base station mmW MU-MIMO manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to MU-MIMO transmissions in mmW systems, etc.). Information may be passed on to other components of the device. The receiver 910 may be an example of aspects of the transceiver 1135 described with reference to FIG. 11. The receiver 910 may utilize a single antenna or a set of antennas.

Base station mmW MU-MIMO manager 915 may be an example of aspects of the base station mmW MU-MIMO manager 1115 described with reference to FIG. 11. Base station mmW MU-MIMO manager 915 may also include correlation manager 925, channel matrix manager 930, and communication manager 935. Correlation manager 925 may receive, from a UE, a message that identifies a cross-correlation metric between beams in a set of receive beams. Channel matrix manager 930 may construct, based on the message, a channel matrix for a channel used for communicating with the UE. Communication manager 935 may communicate with the UE according to the channel matrix.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
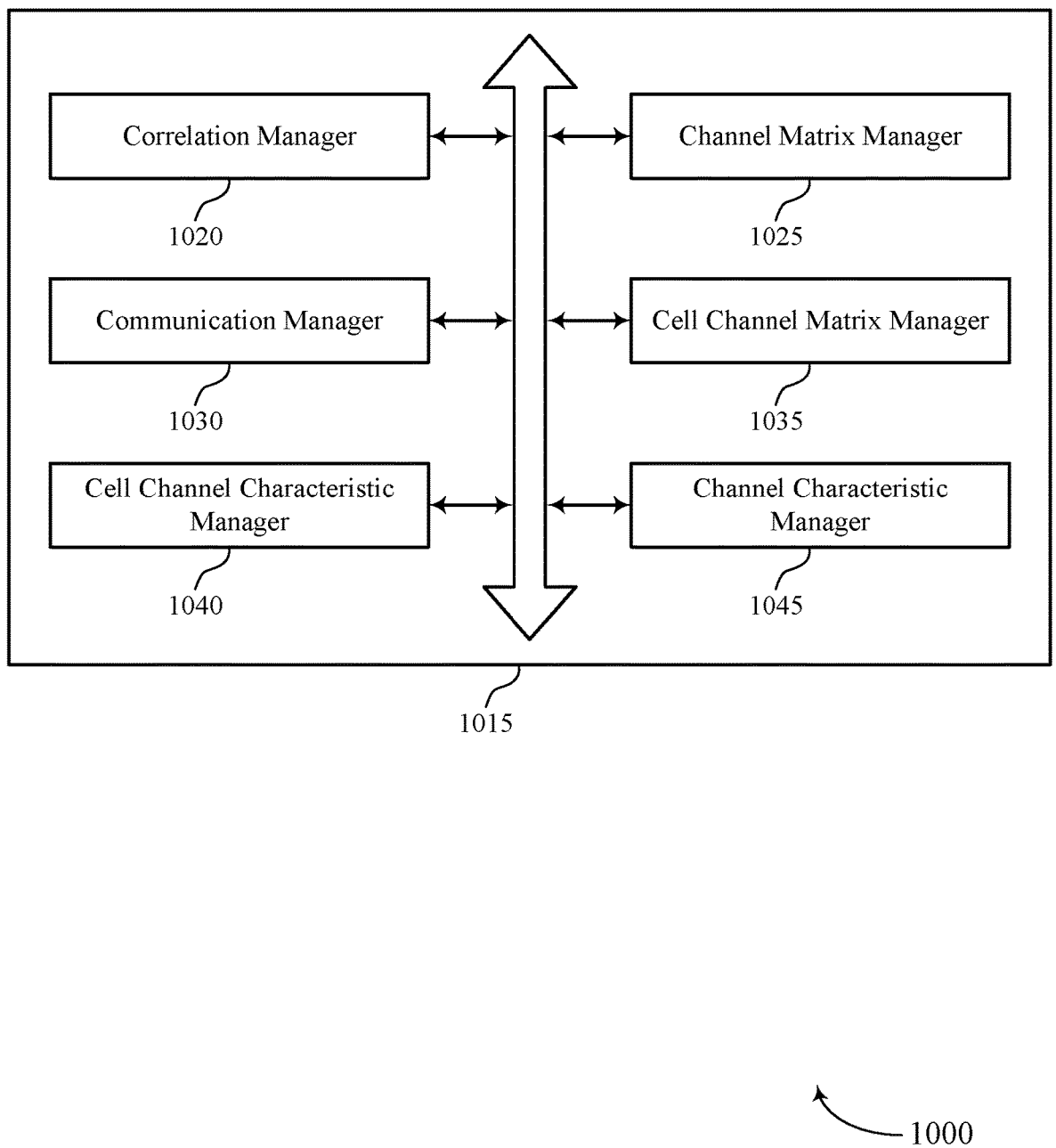

FIG. 10 shows a block diagram 1000 of a base station mmW MU-MIMO manager 1015 that supports MU-MIMO transmissions in mmW systems, in accordance with one or more aspects of the present disclosure. The base station mmW MU-MIMO manager 1015 may be an example of aspects of a base station mmW MU-MIMO manager 1115 described with reference to FIGS. 8, 9, and 11. The base station mmW MU-MIMO manager 1015 may include correlation manager 1020, channel matrix manager 1025, communication manager 1030, cell channel matrix manager 1035, cell channel characteristic manager 1040, and channel characteristic manager 1045. Each of these modules may communicate, directly or indirectly, with one another (e.g., via one or more buses).

Correlation manager 1020 may receive, from a UE, a message that identifies a cross-correlation metric between beams in a set of receive beams. Channel matrix manager 1025 may construct, based on the message, a channel matrix for a channel used for communicating with the UE. Communication manager 1030 may communicate with the UE according to the channel matrix.

Cell channel matrix manager 1035 may receive the message from a set of UEs. Cell channel matrix manager 1035 may construct, based on the message, a channel matrix for each UE of the set of UEs. Cell channel matrix manager 1035 may schedule, based on the channel matrix, one or more sets of UEs for communications according to the associated channel matrix for the UE.

Cell channel characteristic manager 1040 may select a subset of transmit beams to use for the scheduled communications with the one or more sets of UEs.

Channel characteristic manager 1045 may identify, based on the message, a channel quality metric for the UE, where the channel quality metric includes information associated with the UE being scheduled for communications along with at least one other UE and construct the channel matrix based on the channel quality metric. In some cases, the channel quality metric includes a SINR metric.

Figure 11:
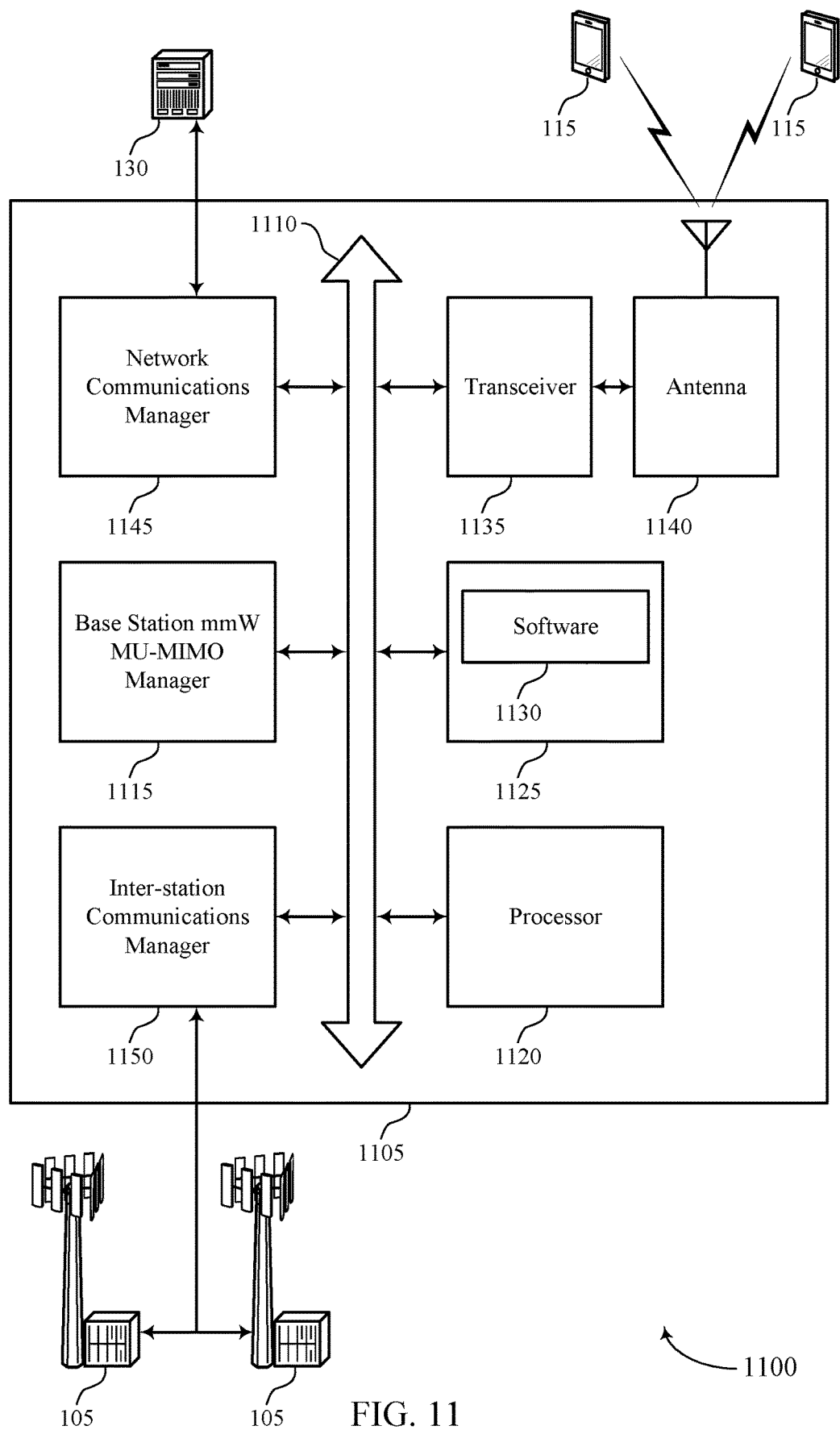
FIG. 11 illustrates a block diagram of a system including a base station that supports MU-MIMO transmissions in mmW systems, in accordance with one or more aspects of the present disclosure.

FIG. 11 shows a diagram of a system 1100 including a device 1105 that supports MU-MIMO transmissions in mmW systems, in accordance with one or more aspects of the present disclosure. Device 1105 may be an example of or include the components of base station 105 as described herein. Device 1105 may include components for bi-directional voice and data communications including components for transmitting and receiving communications, including base station mmW MU-MIMO manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting MU-MIMO transmissions in mmW systems).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware or software operation such as the interaction with peripheral components or devices.

Software 1130 may include code to implement aspects of the present disclosure, including code to support MU-MIMO transmissions in mmW systems. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105 and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within an LTE/LTE-A wireless communication network technology to provide communication between base stations 105.

Figure 12:
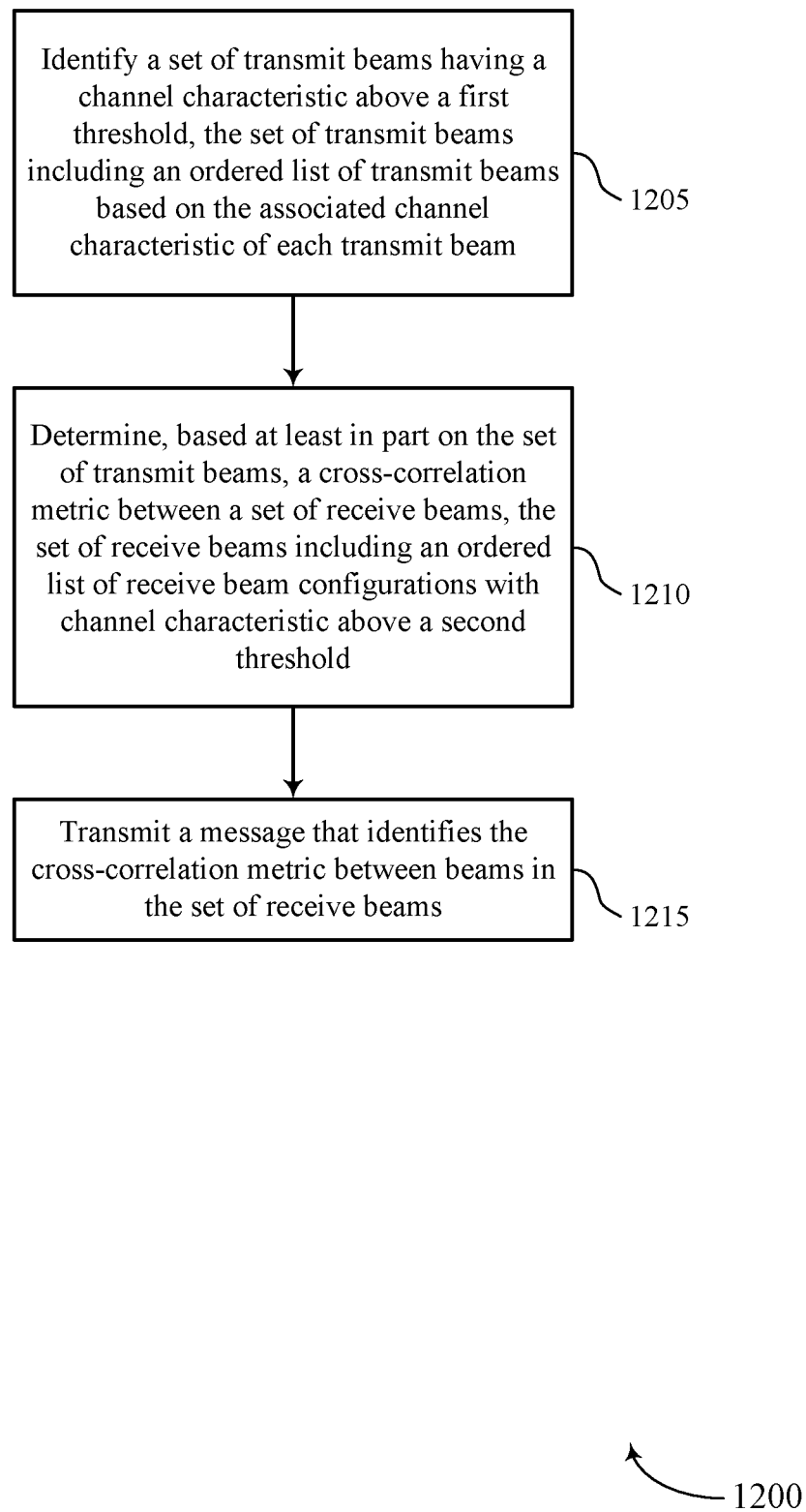
FIGS. 12 through 14 illustrate methods for MU-MIMO transmissions in mmW systems, in accordance with one or more aspects of the present disclosure.

FIG. 12 shows a flowchart illustrating a method 1200 for MU-MIMO transmissions in mmW systems, in accordance with one or more aspects of the present disclosure. The operations of method 1200 may be implemented by a UE 115 or its components as described herein. For example, the operations of method 1200 may be performed by a UE mmW MU-MIMO manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may identify a set of transmit beams having a channel characteristic above a first threshold, the set of transmit beams comprising an ordered list of transmit beams based on the associated channel characteristic of each transmit beam. The operations of block 1205 may be performed according to the methods described herein. In certain examples, aspects of the operations of block 1205 may be performed by a beam manager as described with reference to FIGS. 4 through 7.

At block 1210 the UE 115 may determine, based at least in part on the set of transmit beams, a cross-correlation metric between a set of receive beams, the set of receive beams comprising an ordered list of receive beam configurations with channel characteristic above a second threshold. The operations of block 1210 may be performed according to the methods described herein. In certain examples, aspects of the operations of block 1210 may be performed by a correlation manager as described with reference to FIGS. 4 through 7.

At block 1215 the UE 115 may transmit a message that identifies the cross-correlation metric between beams in the set of receive beams. The operations of block 1215 may be performed according to the methods described herein. In certain examples, aspects of the operations of block 1215 may be performed by a communication manager as described with reference to FIGS. 4 through 7.

Figure 13:
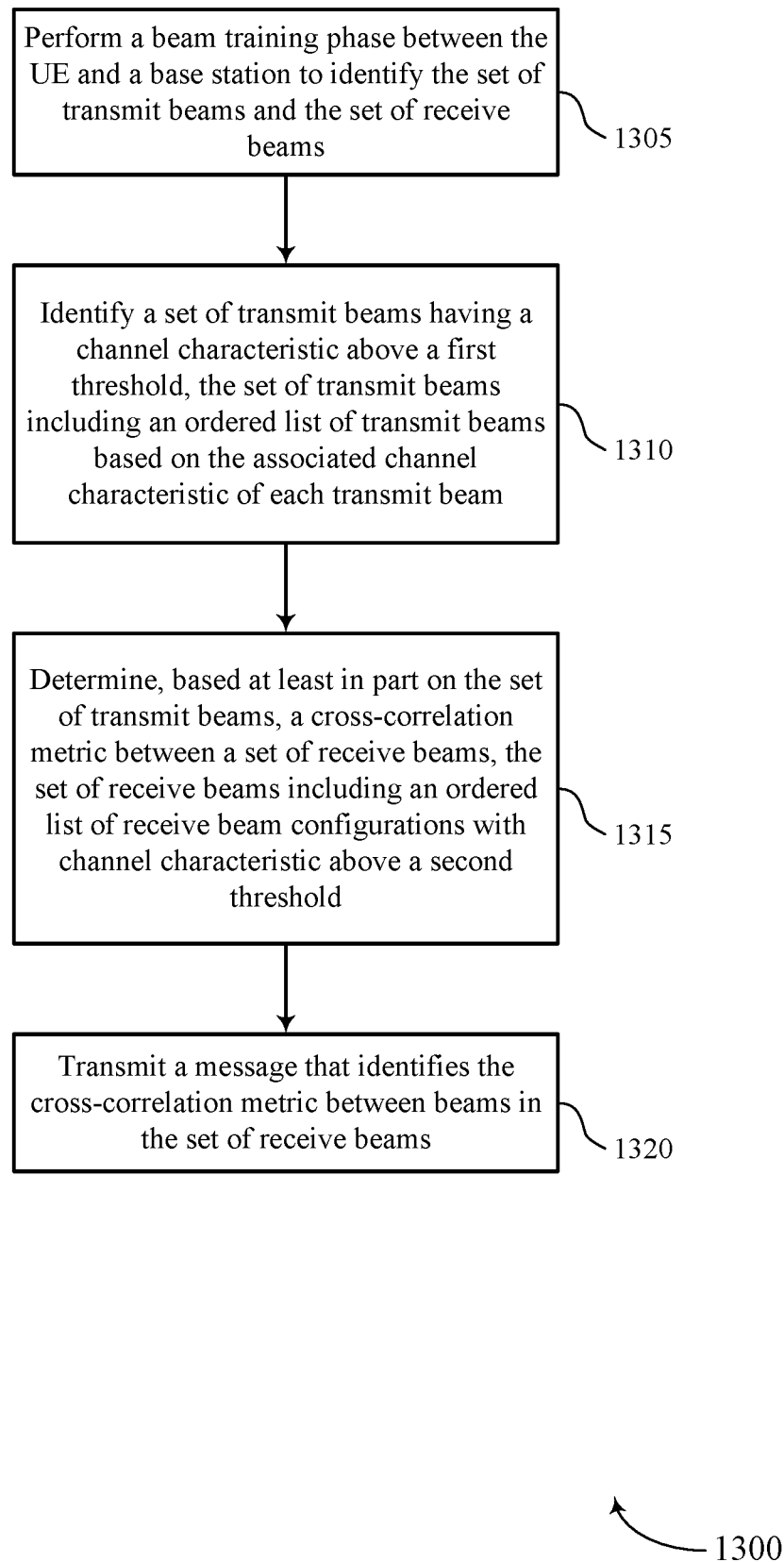

FIG. 13 shows a flowchart illustrating a method 1300 for MU-MIMO transmissions in mmW systems, in accordance with one or more aspects of the present disclosure. The operations of method 1300 may be implemented by a UE 115 or its components as described herein. For example, the operations of method 1300 may be performed by a UE mmW MU-MIMO manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may perform a beam training phase between the UE and a base station to identify the set of transmit beams and the set of receive beams. The operations of block 1305 may be performed according to the methods described herein. In certain examples, aspects of the operations of block 1305 may be performed by a beam training manager as described with reference to FIGS. 4 through 7.

At block 1310 the UE 115 may identify a set of transmit beams having a channel characteristic above a first threshold, the set of transmit beams comprising an ordered list of transmit beams based on the associated channel characteristic of each transmit beam. The operations of block 1310 may be performed according to the methods described herein. In certain examples, aspects of the operations of block 1310 may be performed by a beam manager as described with reference to FIGS. 4 through 7.

At block 1315 the UE 115 may determine, based at least in part on the set of transmit beams, a cross-correlation metric between a set of receive beams, the set of receive beams comprising an ordered list of receive beam configurations with channel characteristic above a second threshold. The operations of block 1315 may be performed according to the methods described herein. In certain examples, aspects of the operations of block 1315 may be performed by a correlation manager as described with reference to FIGS. 4 through 7.

At block 1320 the UE 115 may transmit a message that identifies the cross-correlation metric between beams in the set of receive beams. The operations of block 1320 may be performed according to the methods described herein. In certain examples, aspects of the operations of block 1320 may be performed by a communication manager as described with reference to FIGS. 4 through 7.

Figure 14:
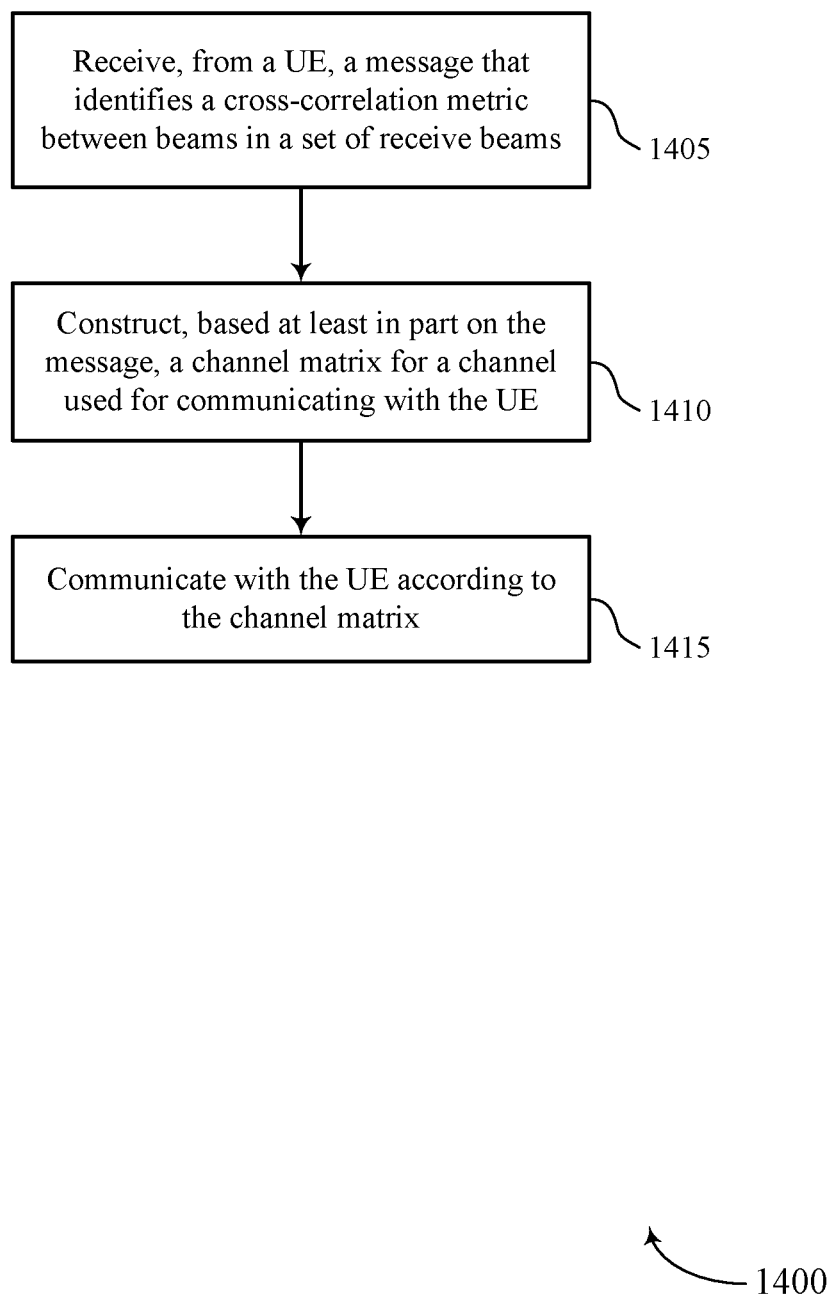

FIG. 14 shows a flowchart illustrating a method 1400 for MU-MIMO transmissions in mmW systems, in accordance with one or more aspects of the present disclosure. The operations of method 1400 may be implemented by a base station 105 or its components as described herein. For example, the operations of method 1400 may be performed by a base station mmW MU-MIMO manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may receive, from a UE, a message that identifies a cross-correlation metric between beams in a set of receive beams. The operations of block 1405 may be performed according to the methods described herein. In certain examples, aspects of the operations of block 1405 may be performed by a correlation manager as described with reference to FIGS. 8 through 11.

At block 1410 the base station 105 may construct, based at least in part on the message, a channel matrix for a channel used for communicating with the UE. The operations of block 1410 may be performed according to the methods described herein. In certain examples, aspects of the operations of block 1410 may be performed by a channel matrix manager as described with reference to FIGS. 8 through 11.

At block 1415 the base station 105 may communicate with the UE according to the channel matrix. The operations of block 1415 may be performed according to the methods described herein. In certain examples, aspects of the operations of block 1415 may be performed by a communication manager as described with reference to FIGS. 8 through 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communication system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communication system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 and 300 of FIGS. 1 and 3—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a set of transmit beams having a channel characteristic above a first threshold, the set of transmit beams comprising an ordered list of transmit beams based on the associated channel characteristic of each transmit beam;
    determining, based at least in part on the identified channel characteristic of the set of transmit beams, a cross-correlation metric between each receive beam of a set of receive beams, the set of receive beams comprising an ordered list of receive beam configurations with channel characteristic above a second threshold; and
    transmitting a message that identifies the cross-correlation metric between each of the receive beams in the set of receive beams.

2. The method of claim 1, further comprising:
    performing a beam training phase between the UE and a base station to identify the set of transmit beams and the set of receive beams.

3. The method of claim 2, further comprising:
    performing the beam training phase using a first channel; and
    transmitting the message using a second channel, wherein the second channel is associated with a lower data rate with respect to the first channel.

4. The method of claim 3, wherein:
    the first channel comprises a millimeter wave channel and the second channel comprises a sub 6 GHz channel.

5. The method of claim 3, wherein:
    the first channel comprises a millimeter wave data channel and the second channel comprises a millimeter wave control channel.

6. The method of claim 1, further comprising:
    transmitting a codebook entry to indicate the identifier of each beam in the set of transmit beams, the channel characteristic for each beam in the set of transmit beams, and the cross-correlation metric between each of the receive beams in the set of receive beams.

7. The method of claim 1, further comprising:
    identifying one or more of a received signal reference power (RSRP), a received signal reference quality (RSRQ), a signal-to-noise ratio (SNR), a signal-to-interference-and noise ratio (SINR), and a channel quality indicator (CQI) associated with each beam in the set of transmit beams, wherein the channel characteristic comprises at least one of the RSRP, the RSRQ, the SNR, the SINR, or the CQI.

8. The method of claim 1, further comprising:
    identifying a number of antenna subarrays of the UE, wherein each subarray has an associated set of receive beams.

9. The method of claim 8, further comprising:
    determining that at least one antenna subarray does not have any receive beams above the second threshold; and
    refraining from identifying the set of receive beams for the at least one antenna subarray.

10. The method of claim 1, further comprising:
    transmitting the message further comprising an identifier that identifies each beam in the set of transmit beams and the channel characteristic for each beam in the set of transmit beams.

11. An apparatus for wireless communication at a user equipment (UE), comprising:
    a processor,
    memory in electronic communication with the processor; and
    instructions stored in the memory and executable by the processor to cause the apparatus to:
        identify a set of transmit beams having a channel characteristic above a first threshold, the set of transmit beams comprising an ordered list of transmit beams based on the associated channel characteristic of each transmit beam;
        determine, based at least in part on the identified channel characteristic of the set of transmit beams, a cross-correlation metric between each receive beam of a set of receive beams, the set of receive beams comprising an ordered list of receive beam configurations with channel characteristic above a second threshold; and
        transmit a message that identifies the cross-correlation metric between each of the receive beams in the set of receive beams.

12. The apparatus of claim 11, wherein the instructions are further executable by the processor to cause the apparatus to:
    perform a beam training phase between the UE and a base station to identify the set of transmit beams and the set of receive beams.

13. The apparatus of claim 12, wherein the instructions are further executable by the processor to cause the apparatus to:
    perform the beam training phase using a first channel; and
    transmit the message using a second channel, wherein the second channel is associated with a lower data rate with respect to the first channel.

14. The apparatus of claim 13, wherein the first channel comprises a millimeter wave channel and the second channel comprises a sub 6 GHz channel.

15. The apparatus of claim 13, wherein the first channel comprises a millimeter wave data channel and the second channel comprises a millimeter wave control channel.

16. The apparatus of claim 11, wherein the instructions are further executable by the processor to cause the apparatus to:
transmit a codebook entry to indicate the identifier of each beam in the set of transmit beams, the channel characteristic for each beam in the set of transmit beams, and the cross-correlation metric between each of the receive beams in the set of receive beams.

17. The apparatus of claim 11, wherein the instructions are further executable by the processor to cause the apparatus to:
identify one or more of a received signal reference power (RSRP), a received signal reference quality (RSRQ), a signal-to-noise ratio (SNR), a signal-to-interference-and-noise ratio (SINR), and a channel quality indicator (CQI) associated with each beam in the set of transmit beams, wherein the channel characteristic comprises at least one of the RSRP, the RSRQ, the SNR, the SINR, or the CQI.

18. The apparatus of claim 11, wherein the instructions are further executable by the processor to cause the apparatus to:
identify a number of antenna subarrays of the UE, wherein each subarray has an associated set of receive beams.

19. The apparatus of claim 18, wherein the instructions are further executable by the processor to cause the apparatus to:
determine that at least one antenna subarray does not have any receive beams above the second threshold; and
refrain from identifying the set of receive beams for the at least one antenna subarray.

20. The apparatus of claim 11, wherein the instructions are further executable by the processor to cause the apparatus to:
transmit the message further comprising an identifier that identifies each beam in the set of transmit beams and the channel characteristic for each beam in the set of transmit beams.

21. A method for wireless communication, comprising:
receiving, from a user equipment (UE), a message that identifies a cross-correlation metric between each receive beam in a set of receive beams based at least in part on a channel characteristic of a set of transmit beams;
constructing, based at least in part on the message, a channel matrix for a channel used for communicating with the UE; and
communicating with the UE according to the channel matrix.

22. The method of claim 21, further comprising:
receiving the message from a plurality of UEs;
constructing, based at least in part on the message, a channel matrix for each UE of the plurality of UEs; and
scheduling, based at least in part on the channel matrix, one or more sets of UEs for communications according to the associated channel matrix for the UE.

23. The method of claim 22, further comprising:
selecting a subset of transmit beams to use for the scheduled communications with the one or more sets of UEs.

24. The method of claim 21, further comprising:
identifying, based at least in part on the message, a channel quality metric for the UE, wherein the channel quality metric comprises information associated with the UE being scheduled for communications along with at least one other UE; and
constructing the channel matrix based at least in part on the channel quality metric.

25. The method of claim 24, wherein:
the channel quality metric comprises a signal-to-interference-and-noise ratio (SINR) metric.

26. An apparatus for wireless communication, comprising:
a processor,
memory in electronic communication with the processor; and
instructions stored in the memory and executable by the processor to cause the apparatus to:
receive, from a user equipment (UE), a message that identifies a cross-correlation metric between each receive beam in a set of receive beams based at least in part on a channel characteristic of a set of transmit beams;
construct, based at least in part on the message, a channel matrix for a channel used for communicating with the UE; and
communicate with the UE according to the channel matrix.

27. The apparatus of claim 26, wherein the instructions are further executable by the processor to cause the apparatus to:
receive the message from a plurality of UEs;
construct, based at least in part on the message, a channel matrix for each UE of the plurality of UEs; and
schedule, based at least in part on the channel matrix, one or more sets of UEs for communications according to the associated channel matrix for the UE.

28. The apparatus of claim 27, wherein the instructions are further executable by the processor to cause the apparatus to:
select a subset of transmit beams to use for the scheduled communications with the one or more sets of UEs.

29. The apparatus of claim 26, wherein the instructions are further executable by the processor to cause the apparatus to:
identify, based at least in part on the message, a channel quality metric for the UE, wherein the channel quality metric comprises information associated with the UE being scheduled for communications along with at least one other UE; and
construct the channel matrix based at least in part on the channel quality metric.

30. The apparatus of claim 29, wherein the channel quality metric comprises a signal-to-interference-and-noise ratio (SINR) metric.

* * * * *